(12) United States Patent
Kurokawa et al.

(10) Patent No.: US 9,971,440 B2
(45) Date of Patent: May 15, 2018

(54) METHOD FOR DRIVING CIRCUIT AND METHOD FOR DRIVING DISPLAY DEVICE

(75) Inventors: Yoshiyuki Kurokawa, Kanagawa (JP); Takayuki Ikeda, Kanagawa (JP); Hikaru Tamura, Kanagawa (JP); Masataka Ikeda, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1562 days.

(21) Appl. No.: 13/043,302

(22) Filed: Mar. 8, 2011

(65) Prior Publication Data

US 2011/0221724 A1 Sep. 15, 2011

(30) Foreign Application Priority Data

Mar. 12, 2010 (JP) ................................ 2010-056727

(51) Int. Cl.
*H01L 31/00* (2006.01)
*G06F 3/041* (2006.01)
*G06F 3/042* (2006.01)

(52) U.S. Cl.
CPC ............ *G06F 3/0416* (2013.01); *G06F 3/042* (2013.01); *G06F 3/0412* (2013.01)

(58) Field of Classification Search
CPC ... H01L 31/00; H01L 31/113; H01L 29/7869; H01L 27/1156; H01L 27/1255; H01L 29/24; G09G 2330/021; G09G 3/3648; G09G 2310/08; G09G 2300/0426
USPC ........................................................ 345/207
See application file for complete search history.

(56) References Cited

U.S. PATENT DOCUMENTS

| | | | |
|---|---|---|---|
| 5,694,495 A | 12/1997 | Hara et al. | |
| 5,731,856 A | 3/1998 | Kim et al. | |
| 5,744,864 A | 4/1998 | Cillessen et al. | |
| 5,926,404 A | 7/1999 | Zeller et al. | |
| 5,949,397 A | 9/1999 | Koyama et al. | |
| 6,294,274 B1 | 9/2001 | Kawazoe et al. | |
| 6,437,768 B1 | 8/2002 | Kubota et al. | |
| 6,552,709 B1 | 4/2003 | Yamaguchi | |
| 6,563,174 B2 | 5/2003 | Kawasaki et al. | |

(Continued)

FOREIGN PATENT DOCUMENTS

| | | |
|---|---|---|
| EP | 1737044 A | 12/2006 |
| EP | 2226847 A | 9/2010 |

(Continued)

OTHER PUBLICATIONS

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

(Continued)

*Primary Examiner* — Michael Faragalla
(74) *Attorney, Agent, or Firm* — Fish & Richardson P.C.

(57) ABSTRACT

To reduce power consumption. Included are a selection signal output circuit, a reset signal output circuit, and a plurality of photodetector circuits. After the selection signal output circuit outputs part of the selection signals, output of the other selection signals from the selection signal output circuit is stopped. After the reset signal output circuit outputs part of the reset signals, output of the other reset signals from the reset signal output circuit is stopped.

19 Claims, 12 Drawing Sheets

(56) References Cited

U.S. PATENT DOCUMENTS

| | | |
|---|---|---|
| 6,724,361 B1 | 4/2004 | Washio et al. |
| 6,727,522 B1 | 4/2004 | Kawasaki et al. |
| 6,809,766 B1 | 10/2004 | Krymski et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,098,950 B2 | 8/2006 | Yamamoto et al. |
| 7,105,868 B2 | 9/2006 | Nause et al. |
| 7,211,825 B2 | 5/2007 | Shih et al |
| 7,218,349 B2 | 5/2007 | Kimura |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,349,052 B2 | 3/2008 | Wu et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,433,007 B2 | 10/2008 | Yang et al. |
| 7,450,209 B2 | 11/2008 | Wu et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,471,277 B2 | 12/2008 | Sagawa et al. |
| 7,477,216 B2 | 1/2009 | Koyama et al. |
| 7,501,293 B2 | 3/2009 | Ito et al. |
| 7,583,348 B2 | 9/2009 | Yang et al. |
| 7,663,593 B2 | 2/2010 | Jinta |
| 7,674,650 B2 | 3/2010 | Akimoto et al. |
| 7,732,819 B2 | 6/2010 | Akimoto et al. |
| 7,882,379 B2 | 2/2011 | Kanakogi |
| 8,111,231 B2 | 2/2012 | Sagawa et al. |
| 8,203,638 B2 * | 6/2012 | Parks et al. ............. 348/296 |
| 8,390,578 B2 * | 3/2013 | Chino ............... G06F 3/0416 |
| | | 178/18.01 |
| 8,530,246 B2 | 9/2013 | Ofuji et al. |
| 8,593,443 B2 | 11/2013 | Maeda et al. |
| 8,610,652 B2 | 12/2013 | Lee et al. |
| 8,638,317 B2 | 1/2014 | Harada et al. |
| 2001/0028392 A1 | 10/2001 | Yamamoto et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0052324 A1 | 3/2003 | Kimura |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0088630 A1 | 5/2004 | Arima et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0132463 A1 | 6/2006 | Lee et al. |
| 2006/0146160 A1 | 7/2006 | Murakami et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0214893 A1 | 9/2006 | Tseng et al. |
| 2006/0228974 A1 | 10/2006 | Thelss et al. |
| 2006/0229520 A1 | 10/2006 | Yamashita et al. |
| 2006/0231882 A1 | 10/2006 | Kim et al. |
| 2006/0238135 A1 | 10/2006 | Kimura |
| 2006/0238486 A1 | 10/2006 | Hiraki |
| 2006/0244107 A1 | 11/2006 | Sugihara et al. |
| 2006/0250513 A1 | 11/2006 | Yamamoto et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0040792 A1 | 2/2007 | Kwag et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0055225 A1 | 3/2008 | Pak et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0143905 A1 | 6/2008 | Wu et al. |
| 2008/0166834 A1 | 7/2008 | Kim et al. |
| 2008/0182358 A1 | 7/2008 | Cowdery-Corvan et al. |
| 2008/0186267 A1 | 8/2008 | Mamba et al. |
| 2008/0192130 A1 | 8/2008 | Noh |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0260090 A1 | 10/2008 | Tso et al. |
| 2008/0296568 A1 | 12/2008 | Ryu et al. |
| 2009/0001256 A1 * | 1/2009 | Yanagisawa ......... H01L 31/075 |
| | | 250/214.1 |
| 2009/0033850 A1 | 2/2009 | Ishiguro et al. |
| 2009/0051801 A1 * | 2/2009 | Mishina ............... H04N 5/3742 |
| | | 348/311 |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2010/0231562 A1 | 9/2010 | Brown |
| 2011/0115724 A1 | 5/2011 | Jeon et al. |
| 2011/0122096 A1 | 5/2011 | Kim et al. |
| 2011/0221704 A1 | 9/2011 | Kurokawa et al. |
| 2011/0267297 A1 | 11/2011 | Yamazaki et al. |
| 2012/0188207 A1 * | 7/2012 | Usukura et al. ............. 345/175 |

FOREIGN PATENT DOCUMENTS

| | | |
|---|---|---|
| EP | 2323021 A | 5/2011 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 07-046483 A | 2/1995 |
| JP | 08-264794 A | 10/1996 |
| JP | 08-292998 A | 11/1996 |
| JP | 09-055890 A | 2/1997 |

(56) References Cited

FOREIGN PATENT DOCUMENTS

| JP | 09-163232 A | 6/1997 |
|---|---|---|
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2003-092709 A | 3/2003 |
| JP | 2003-163346 A | 6/2003 |
| JP | 2003-304451 A | 10/2003 |
| JP | 2004-103957 A | 4/2004 |
| JP | 2004-273614 A | 9/2004 |
| JP | 2004-273732 A | 9/2004 |
| JP | 2005-184634 A | 7/2005 |
| JP | 2007-018458 A | 1/2007 |
| JP | 2008-011007 A | 1/2008 |
| JP | 2008-172609 A | 7/2008 |
| JP | 2009-049740 A | 3/2009 |
| JP | 2009-181360 A | 8/2009 |
| JP | 2009-193483 A | 8/2009 |
| JP | 2010-153992 A | 7/2010 |
| KR | 2006-0096297 A | 9/2006 |
| WO | WO-2004/114391 | 12/2004 |
| WO | WO-2010/026830 | 3/2010 |

OTHER PUBLICATIONS

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Kimizuka.N. et al., "Spinel,YBFE2O4, and YB2FE3O7 Types of Structures for Compounds in the IN2O3 and SC2O3-A2O3-BO Systems [A; Fe, Ga, or Al; B: Mg, Mn, Fe, Ni, Cu,or Zn] at Temperatures Over 1000°C", Journal of Solid State Chemistry, 1985, vol. 60, pp. 382-384.

Nakamura.M et al., "The phase relations in the In2O3-Ga2ZnO4-ZnO system at 1350°C", Journal of Solid State Chemistry, Aug. 1, 1991, vol. 93, No. 2, pp. 298-315.

Kitzerow.H et al., "Observation of Blue Phases in Chiral Networks", Liquid Crystals, 1993, vol. 14, No. 3, pp. 911-916.

Kimizuka.N. et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3-ZnGa2O4-ZnO System", Journal of Solid State Chemistry, Apr. 1, 1995, vol. 116, No. 1, pp. 170-178.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Prins.M et al., "A Ferroelectric Transparent Thin-Film Transistor", Appl. Phys. Lett. (Applied Physics Letters), Jun. 17, 1996, vol. 68, No. 25, pp. 3650-3652.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Kikuchi.H et al., "Polymer-Stabilized Liquid Crystal Blue Phases", Nature Materials, Sep. 2, 2002, vol. 1, pp. 64-68.

Tsuda.K et al., "Ultra Low Power Consumption Technologies for Mobile TFT-LCDs ", IDW '02: Proceedings of the 9th International Display Workshops, Dec. 4, 2002, pp. 295-298.

Nomura.K et al., "Thin-Film Transistor Fabricated in Single-Crystalline Transparent Oxide Semiconductor", Science, May 23, 2003, vol. 300, No. 5623, pp. 1269-1272.

Ikeda.T et al., "Full-Functional System Liquid Crystal Display Using CG-Silicon Technology", SID Digest '04: SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

Lee.H et al., "Current Status of, Challenges to, and Perspective View of AM-OLED", IDW '06: Proceedings of the 13th International Display Workshops, Dec. 7, 2006, pp. 663-666.

Hosono.H, "68.3:Invited Paper:Transparent Amorphous Oxide Semiconductors for High Performance TFT", SID Digest '07: SID International Symposium Digest of Technical Papers, 2007, vol. 38, pp. 1830-1833.

Hirao.T et al., "Novel Top-Gate Zinc Oxide Thin-Film Transistors (ZNO TFTs) for AMLCDS", J. Soc. Inf. Display (Journal of the Society for Information Display), 2007, vol. 15, No. 1, pp. 17-22.

Park.S et al., "Challenge to Future Displays: Transparent AM-OLED Driven by Peald Grown ZNO TFT", IMID '07 Digest, 2007, pp. 1249-1252.

Kikuchi.H et al., "62.2:Invited Paper:Fast Electro-Optical Switching in Polymer-Stabilized Liquid Crystalline Blue Phases for Display Application", SID Digest '07: SID International Symposium Digest of Technical Papers, 2007, vol. 38, pp. 1737-1740.

Miyasaka.M, "Suftla Flexible Microelectronics on Their Way to Business", SID Digest '07: SID International Symposium Digest of Technical Papers, 2007, vol. 38, pp. 1673-1676.

Kurokawa.Y et al., "UHF RFCPUS on Flexible and Glass Substrates for Secure RFID Systems", Journal of Solid-State Circuits, 2008, vol. 43, No. 1, pp. 292-299.

Jeong.J et al., "3.1: Distinguished Paper: 12.1-Inch WXGA AMOLED Display Driven by Indium-Gallium-Zinc Oxide TFTs Array", SID Digest '08: SID International Symposium Digest of Technical Papers, May 20, 2008, vol. 39, No. 1, pp. 1-4.

Lee.J et al., "World'S Largest (15-Inch) XGA AMLCD Panel Using IGZO Oxide TFT", SID Digest '08: SID International Symposium Digest of Technical Papers, May 20, 2008, vol. 39, pp. 625-628.

Park.J et al., "Amorphous Indium-Gallium-Zinc Oxide TFTs and Their Application for Large Size AMOLED", AM-FPD '08 Digest of Technical Papers, Jul. 2, 2008, pp. 275-278.

Takahashi.M et al., "Theoretical Analysis of IGZO Transparent Amorphous Oxide Semiconductor", IDW '08: Proceedings of the 15th International Display Workshops, Dec. 3, 2008, pp. 1637-1640.

Sakata.J et al., "Development of 4.0-In. AMOLED Display With Driver Circuit Using Amorphous In-Ga-Zn-Oxide TFTs", IDW '09: Proceedings of the 16th International Display Workshops, 2009, pp. 689-692.

Asaoka.Y et al., "29.1:Polarizer-Free Reflective LCD Combined With Ultra Low-Power Driving Technology", SID Digest '09: SID International Symposium Digest of Technical Papers, May 31, 2009, pp. 395-398.

Nowatari.H et al., "60.2: Intermediate Connector With Suppressed Voltage Loss for White Tandem OLEDs", SID Digest '09: SID International Symposium Digest of Technical Papers, May 31, 2009, vol. 40, pp. 899-902.

Jin.D et al., "65.2:Distinguished Paper:World-Largest (6.5") Flexible Full Color Top Emission AMOLED Display on Plastic Film and Its Bending Properties", SID Digest '09: SID International Symposium Digest of Technical Papers, May 31, 2009, pp. 983-985.

Lee.M et al., "15.4:Excellent Performance of Indium-Oxide-Based Thin-Film Transistors by DC Sputtering", SID Digest '09: SID International Symposium Digest of Technical Papers, May 31, 2009, pp. 191-193.

Cho.D et al., "21.2:AL and Sn-Doped Zinc Indium Oxide Thin Film Transistors for AMOLED Back Plane", SID Digest '09: SID International Symposium Digest of Technical Papers, May 31, 2009, pp. 280-283.

Kikuchi.H et al., "39.1:Invited Paper:Optically Isotropic Nano-Structured Liquid Crystal Composites for Display Applications",

(56) References Cited

OTHER PUBLICATIONS

SID Digest '09: SID International Symposium Digest of Technical Papers, May 31, 2009, pp. 578-581.

Osada.T et al., "15.2: Development of Driver-Integrated Panel using Amorphous In-Ga-Zn-Oxide TFT", SID Digest '09: SID International Symposium Digest of Technical Papers, May 31, 2009, vol. 40, pp. 184-187.

Ohara.H et al., "21.3:4.0 In. QVGA AMOLED Display Using In-Ga-Zn-Oxide TFTs With a Novel Passivation Layer", SID Digest '09: SID International Symposium Digest of Technical Papers, May 31, 2009, pp. 284-287.

Godo.H et al., "P-9:Numerical Analysis on Temperature Dependence of Characteristics of Amorphous In-Ga-Zn-Oxide-TFT", SID Digest '09: SID International Symposium Digest of Technical Papers, May 31, 2009, pp. 1110-1112.

Osada.T et al., "Development of Driver-Integrated Panel Using Amorphous In-Ga-Zn-Oxide TFT", AM-FPD '09 Digest of Technical Papers, Jul. 1, 2009, pp. 33-36.

Godo.H et al., "Temperature Dependence of Characteristics and Electronic Structure for Amorphous In-Ga-Zn-Oxide TFT", AM-FPD '09 Digest of Technical Papers, Jul. 1, 2009, pp. 41-44.

Ohara.H et al., "Amorphous In-Ga-Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Park.J et al., "High performance amorphous oxide thin film transistors with self-aligned top-gate structure", IEDM 09: Technical Digest of International Electron Devices Meeting, Dec. 7, 2009, pp. 191-194.

Nakamura.M, "Synthesis of Homologous Compound with New Long-Period Structure", NIRIM Newsletter, Mar. 1, 1995, vol. 150, pp. 1-4.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

Orita.M et al., "Amorphous transparent conductive oxide InGaO3(ZnO)m (m<4):a Zn4s conductor", Philosophical Magazine, 2001, vol. 81, No. 5, pp. 501-515.

Janotti.A et al., "Oxygen Vacancies In ZnO", Appl. Phys. Lett. (Applied Physics Letters), 2005, vol. 87, pp. 122102-1-122102-3.

Clark.S et al., "First Principles Methods Using CASTEP", Zeitschrift fur Kristallographie, 2005, vol. 220, pp. 567-570.

Nomura.K et al., "Amorphous Oxide Semiconductors for High-Performance Flexible Thin-Film Transistors", Jpn. J. Appl. Phys. (Japanese Journal of Applied Physics), 2006, vol. 45, No. 5B, pp. 4303-4308.

Janotti.A et al., "Native Point Defects in ZnO", Phys. Rev. B (Physical Review. B), Oct. 4, 2007, vol. 76, No. 16, pp. 165202-1-165202-22.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Park.J et al., "Improvements in the Device Characteristics of Amorphous Indium Gallium Zinc Oxide Thin-Film Transistors by Ar Plasma Treatment", Appl. Phys. Lett. (Applied Physics Letters), Jun. 26, 2007, vol. 90, No. 26, pp. 262106-1-262106-3.

Park.J et al., "Electronic Transport Properties of Amorphous Indium-Gallium-Zinc Oxide Semiconductor Upon Exposure to Water", Appl. Phys. Lett. (Applied Physics Letters), 2008, vol. 92, pp. 072104-1-072104-3.

Hsieh.H et al., "P-29:Modeling of Amorphous Oxide Semiconductor Thin Film Transistors and Subgap Density of States", SID Digest '08: SID International Symposium Digest of Technical Papers, May 20, 2008, vol. 39, pp. 1277-1280.

Oba.F et al., "Defect energetics in ZnO: A hybrid Hartree-Fock density functional study", Phys. Rev. B (Physical Review. B), 2008, vol. 77, pp. 245202-1-245202-6.

Kim.S et al., "High-Performance oxide thin film transistors passivated by various gas plasmas", 214th ECS Meeting, 2008, No. 2317, ECS.

Hayashi.R et al., "42.1: Invited Paper: Improved Amorphous In-Ga-Zn-O TFTs", SID Digest '08: SID International Symposium Digest of Technical Papers, May 20, 2008, vol. 39, pp. 621-624.

Son.K et al., "42.4L: Late-News Paper: 4 Inch QVGA AMOLED Driven by the Threshold Voltage Controlled Amorphous Gizo (Ga2O3-In2O3-ZnO) TFT", SID Digest '08: SID International Symposium Digest of Technical Papers, May 20, 2008, vol. 39, pp. 633-636.

Park.Sang-Hee et al., "42.3: Transparent ZnO Thin Film Transistor for the Application of High Aperture Ratio Bottom Emission AM-OLED Display", SID Digest '08: SID International Symposium Digest of Technical Papers, May 20, 2008, vol. 39, pp. 629-632.

Fung.T et al., "2-D Numerical Simulation of High Performance Amorphous In-Ga-Zn-O TFTs for Flat Panel Displays", AM-FPD '08 Digest of Technical Papers, Jul. 2, 2008, pp. 251-252, The Japan Society of Applied Physics.

Mo.Y et al., "Amorphous Oxide TFT Backplanes for Large Size AMOLED Displays", IDW '08: Proceedings of the 6th International Display Workshops, Dec. 3, 2008, pp. 581-584.

Asakuma.N. et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.

Fortunato.E et al., "Wide-Bandgap High-Mobility ZNO Thin-Film Transistors Produced at Room Temperature", Appl. Phys. Lett. (Applied Physics Letters), Sep. 27, 2004, vol. 85, No. 13, pp. 2541-2543.

Masuda.S et al., "Transparent thin film transistors using ZnO as an active channel layer and their electrical properties", J. Appl. Phys. (Journal of Applied Physics), Feb. 1, 2003, vol. 93, No. 3, pp. 1624-1630.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Ueno.K et al., "Field-Effect Transistor on SrTiO3 with Sputtered Al2O3 Gate Insulator", Appl. Phys. Lett. (Applied Physics Letters), Sep. 1, 2003, vol. 83, No. 9, pp. 1755-1757.

Nomura.K et al., "Carrier transport in transparent oxide semiconductor with intrinsic structural randomness probed using single-crystalline InGaO3(ZnO)5 films", Appl. Phys. Lett. (Applied Physics Letters) , Sep. 13, 2004, vol. 85, No. 11, pp. 1993-1995.

International Search Report, PCT Application No. PCT/JP2011/053615, dated Mar. 22, 2011, 3 pages.

Written Opinion, PCT Application No. PCT/JP2011/053615, dated Mar. 22, 2011, 4 pages.

* cited by examiner

METHOD FOR DRIVING CIRCUIT AND METHOD FOR DRIVING DISPLAY DEVICE

TECHNICAL FIELD

An embodiment of the present invention relates to a method for driving an input circuit. Another embodiment of the present invention relates to a method for driving an input-output device.

BACKGROUND ART

In recent years, technological development of the following has been advanced: input circuits capable of inputting data when light is incident thereon, input-output devices capable of inputting data when light is incident thereon and performing output in accordance with the input data, and the like.

Examples of the input circuits include touch panels incorporating image sensors or photosensors. The image sensors generally include CCD sensors and CMOS sensors. The CCD sensors are image sensors that perform charge transmission by vertical CCD and parallel CCD. The CMOS sensors are image sensors manufactured through a CMOS process. The CMOS sensors can control a reading operation of charge for each pixel with the use of switches of MOS transistors (for example, Patent Document 1).

Examples of the input-output devices include an input-output device incorporating photosensors (for example, Patent Document 2). The input-output device incorporating photosensors can function as a touch panel when each pixel portion is provided with a display circuit and a photodetector circuit (also referred to as a photosensor) and the photodetector circuit detects the illuminance of light incident on the pixel portion. Further, the input-output device incorporating photosensors can also change display states in accordance with detection results obtained by the photodetector circuits. For example, by using the touch panel, a figure such as an alphabet written on the touch panel can be displayed as input text data.

REFERENCE

[Patent Document 1] Japanese Published Patent Application No. 2009-049740
[Patent Document 2] Japanese Published Patent Application No. 2007-018458

DISCLOSURE OF INVENTION

Conventional input circuits and input-output devices consume a large amount of power because data of the illuminance of light is read with photodetector circuits repeatedly every several milliseconds to several tens of milliseconds. Moreover, in the conventional input circuits and input-output devices, reading operations are performed in all the photodetector circuits even in the case where there is no change in illuminance of light incident on parts of the photodetector circuits of photodetection portions, and excessive power is consumed accordingly.

An object of one embodiment of the present invention is to reduce power consumption.

One embodiment of the present invention includes a selection signal output circuit, a reset signal output circuit, and a plurality of photodetector circuits. The selection signal output circuit is for outputting a plurality of selection signals. The reset signal output circuit is for outputting a plurality of reset signals. The plurality of photodetector circuits are each supplied with any one of the plurality of reset signals and any one of the plurality of selection signals, are each brought into a reset state in accordance with the input reset signal, each generate a voltage corresponding to the illuminance of incident light when light enters the photodetector circuit, and each output the generated voltage as a data signal in accordance with the input selection signal. After the selection signal output circuit outputs part of the selection signals, output of the other selection signals from the selection signal output circuit is stopped. After the reset signal output circuit outputs part of the reset signals, output of the other reset signals from the reset signal output circuit is stopped.

One embodiment of the present invention is a method for driving an input circuit. The input circuit includes a selection signal output circuit, a reset signal output circuit, and a plurality of photodetector circuits. The selection signal output circuit includes a first shift register to which a first start signal, a first clock signal, and a power supply voltage are input and outputs B (B is a natural number larger than or equal to 2) selection signals when the first shift register outputs A (A is a natural number larger than or equal to 2) signals. The reset signal output circuit includes a second shift register to which a second start signal, a second clock signal, and a power supply voltage are input and outputs D (D is a natural number larger than or equal to 2) reset signals when the second shift register outputs C (C is a natural number larger than or equal to 2) signals. The plurality of photodetector circuits are each supplied with any one of the D reset signals and any one of the B selection signals, are each brought into a reset state in accordance with the input reset signal, each generate a voltage corresponding to the illuminance of incident light when light enters the photodetector circuit, and each output the generated voltage as a data signal in accordance with the input selection signal. The method for driving the input circuit is as follows. The selection signal output circuit outputs the W-th (W is a natural number larger than or equal to 1 and smaller than or equal to (B−1)) selection signal, and then output of the (W+1)-th selection signal from the selection signal output circuit is stopped. The reset signal output circuit outputs the V-th (V is a natural number larger than or equal to 1 and smaller than or equal to (D−1)) reset signal, and then output of the (V+1)-th reset signal from the reset signal output circuit is stopped.

One embodiment of the present invention is a method for driving an input-output device. The input-output device includes a display circuit, a selection signal output circuit, a reset signal output circuit, and a plurality of photodetector circuits. The display circuit is supplied with a scan signal and supplied with an image signal in accordance with the scan signal to be in a display state depending on the image signal. The selection signal output circuit includes a first shift register to which a first start signal, a first clock signal, and a power supply voltage are input and outputs B (B is a natural number larger than or equal to 2) selection signals when the first shift register outputs A (A is a natural number larger than or equal to 2) signals. The reset signal output circuit includes a second shift register to which a second start signal, a second clock signal, and a power supply voltage are input and outputs D (D is a natural number larger than or equal to 2) reset signals when the second shift register outputs C (C is a natural number larger than or equal to 2) signals. The plurality of photodetector circuits are each supplied with any one of the D reset signals and any one of the B selection signals, are each brought into a reset state in accordance with the input reset signal, each generate a voltage corresponding to the illuminance of incident light when light enters the photodetector circuit, and each output the generated voltage as a data signal in accordance with the input selection signal. In the input-output device, the display circuit performs a displaying operation, and the photodetector circuit performs a reading operation. The method for driving the input-output device is as follows. In the reading operation, the selection signal output circuit outputs the W-th (W is a natural number larger than or equal to 1 and smaller than or equal to (B−1)) selection signal, and then output of the (W+1)-th selection signal from the selection signal output circuit is stopped. The reset signal output circuit outputs the V-th (V is a natural number larger than or equal to 1 and smaller than or equal to (D−1)) reset signal, and then output of the (V+1)-th reset signal from the reset signal output circuit is stopped.

Note that in this specification, terms with ordinal numbers, such as "first" and "second", are used in order to avoid confusion among components, and the terms do not limit the components numerically.

According to one embodiment of the present invention, an operation of outputting signals to part of the photodetector circuits can be selectively stopped; thus, power consumption can be reduced.

BEST MODE FOR CARRYING OUT THE INVENTION

Hereinafter, embodiments of the present invention will be described with reference to the drawings. Note that the present invention is not limited to the following description, and it will be easily understood by those skilled in the art that various changes and modifications can be made without departing from the spirit and scope of the present invention. Thus, the present invention should not be interpreted as being limited to the following description of the embodiments.

Note that contents described in the following embodiments can be combined with or replaced with each other as appropriate.

Embodiment 1

In this embodiment, described is an input circuit which can input data when light enters the input circuit.

Figure 1A:
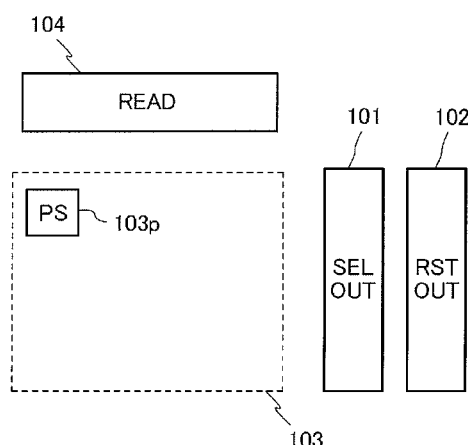
FIGS. 1A and 1B illustrate an example of an input circuit in Embodiment 1.
Figure 1B:
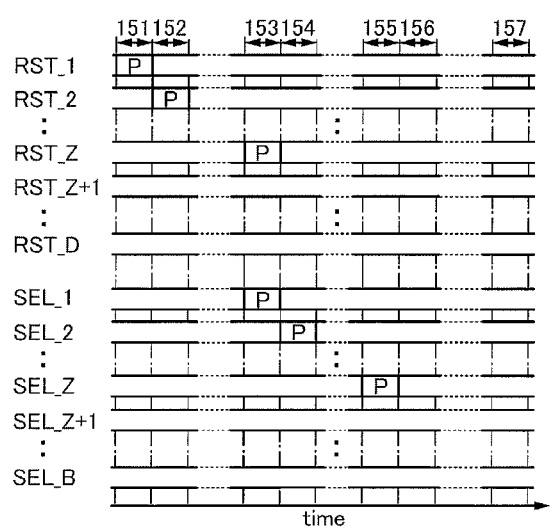

An example of the input circuit in this embodiment is described with reference to FIGS. 1A and 1B. FIGS. 1A and 1B are diagrams for describing the example of the input circuit in this embodiment.

First, an example of the configuration of the input circuit in this embodiment is described with reference to FIG. 1A. FIG. 1A is a block diagram illustrating the example of the configuration of the input circuit in this embodiment.

The input circuit in FIG. 1A includes a selection signal output circuit (also referred to as SELOUT) 101, a reset signal output circuit (also referred to as RSTOUT) 102, a plurality of photodetector circuits (also referred to as PS) 103$p$, and a reading circuit (also referred to as READ) 104.

The selection signal output circuit 101 includes a shift register, and a start signal, a clock signal, and a power supply voltage are input to the shift register. When the shift register outputs A (A is a natural number larger than or equal to 2) signals, the selection signal output circuit 101 outputs B (B is a natural number larger than or equal to 2) selection signals SEL. The selection signal SEL is for controlling whether the photodetector circuit 103$p$ outputs a signal. For example, the A signals output from the shift register may be output as the selection signals SEL. Alternatively, the A signals may be output from the shift register to a logic circuit and output signals of the logic circuit may be the selection signals SEL.

Note that a voltage generally refers to a difference between potentials at two points (also referred to as a potential difference). However, values of both a voltage and a potential are represented using volt (V) in a circuit diagram or the like in some cases, so that it is difficult to discriminate between them. This is why in this specification, a potential difference between a potential at one point and a potential to be the reference (also referred to as the reference potential) is used as a voltage at the point in some cases except for a case particularly specified.

The reset signal output circuit 102 includes a shift register, and a start signal, a clock signal, and a power supply voltage are input to the shift register. When the shift register outputs C (C is a natural number larger than or equal to 2) signals, the reset signal output circuit 102 outputs D (D is a natural number larger than or equal to 2) reset signals RST. When the reset signal output circuit 102 is provided, the photodetector circuit 103$p$ can be brought into a reset state. The reset signal RST is for controlling whether the photodetector circuit 103$p$ is reset. For example, the C signals output from the shift register may be output as the reset signals RST. Alternatively, the C signals may be output from the shift register to a logic circuit and output signals of the logic circuit may be the reset signals RST.

Note that the number of the signals output from the shift register of the selection signal output circuit 101 may be either the same as or different from that of the signals output from the shift register of the reset signal output circuit 102. Further, the number of the selection signals SEL output from the selection signal output circuit 101 may be either the same as or different from that of the reset signals RST output from the reset signal output circuit 102.

The photodetector circuit 103p generates a voltage corresponding to the illuminance of incident light when light enters the photodetector circuit 103p. Note that a voltage corresponding to the illuminance of incident light is also referred to as an optical data voltage. The plurality of photodetector circuits 103p are provided in the photodetection portion 103 to which data is input externally when light is detected.

Supplied with one of the D reset signals RST, the photodetector circuit 103p is brought into a reset state in accordance with the supplied reset signal RST. Note that when the photodetector circuit 103p is in a reset state, an optical data voltage is a reference value.

Further, supplied with one of the B selection signals SEL, the photodetector circuit 103p outputs an optical data voltage as a data signal in accordance with the supplied selection signal SEL.

For example, the photodetector circuit 103p may include an amplifying transistor and a photoelectric conversion element (also referred to as PCE).

The photoelectric conversion element is capable of generating a current (also referred to as a photocurrent) corresponding to the illuminance of incident light when light enters the photoelectric conversion element.

The amplifying transistor has two terminals and a control terminal for controlling a conduction state between the two terminals. The voltage of the control terminal changes in accordance with a photocurrent corresponding to the illuminance of incident light, whereby the amplifying transistor sets the voltage of an output signal of the photodetector circuit 103p. Thus, an optical data voltage output from the photodetector circuit 103p depends on the illuminance of light incident on the photodetector circuit 103p.

The photodetector circuit 103p may be further provided with an output selecting transistor so that an optical data voltage is output as a data signal from the photodetector circuit 103p when the transistor is turned on in accordance with the selection signal SEL.

The reading circuit 104 has a function of sequentially selecting the plurality of photodetector circuits 103p to read an optical data voltage output from the selected photodetector circuit 103p as a data signal.

For example, a selection circuit may be used for the reading circuit 104. Supplied with a reading selection signal, the selection circuit used for the reading circuit 104 selects the photodetector circuit 103p from which an optical data voltage is read, in accordance with the input reading selection signal. Note that the selection circuit may select a plurality of the photodetector circuits 103p, from which optical data voltages are read, at one time. The selection circuit may include, for example, a plurality of transistors so that the photodetector circuit 103p from which an optical data voltage is read can be selected when the plurality of transistors are turned on or off.

Note that by using a control circuit, for example, operations of the selection signal output circuit 101, the reset signal output circuit 102, and the reading circuit 104 can be controlled.

The control circuit has a function of outputting a control signal that is a pulse signal. The control signal is output to the selection signal output circuit 101, the reset signal output circuit 102, and the reading circuit 104, whereby operations of the selection signal output circuit 101, the reset signal output circuit 102, and the reading circuit 104 can be controlled in accordance with a pulse of the control signal. For example, output of a start signal, a clock signal, or a power supply voltage to the shift registers of the selection signal output circuit 101 and the reset signal output circuit 102 can be started or stopped in accordance with a pulse of the control signal. The control circuit may be controlled using a CPU, for example. For example, an interval between pulses of control signals generated by the control circuit may be set using a CPU.

Operations of the selection signal output circuit 101, the reset signal output circuit 102, and the reading circuit 104 may be controlled in accordance with not only the control circuit but an operation signal. The operation signal is a signal indicating whether a user has performed an input operation of the input circuit. As the input operation, a user's operation of touching the photodetection portion 103, or the like can be given. For example, when an operation signal is input to the control circuit through an interface, the control circuit generates control signals whose pulse intervals are set in accordance with the input operation signal, and the generated control signal is output to the selection signal output circuit 101 or the reset signal output circuit 102.

Next, an example of a method for driving the input circuit in FIG. 1A is described as an example of a method for driving the input circuit in this embodiment.

In the example of a method for driving the input circuit in FIG. 1A, there are a period in which optical data voltages are output as data signals in all of the photodetector circuits (also referred to as an entirely reading period) and a period in which output of an optical data voltage is stopped in part of the photodetector circuits and optical data voltages are output as data signals in the other photodetector circuits (also referred to as a partly reading period). Note that an operation where optical data voltages are output as data signals in all the photodetector circuits is also referred to as an entirely reading operation and an operation where output of an optical data voltage is stopped in part of the photodetector circuits and optical data voltages are output as data signals in the other photodetector circuits is also referred to as a partly reading operation.

First, described is an operation example of the input circuit in the entirely reading period.

In the entirely reading period, output of pulses of the reset signals RST are started sequentially from the first reset signal RST_1. After that, output of pulses of the selection signals SEL are started sequentially from the first selection signal SEL_1. Thus, the pulses of the reset signals RST are sequentially output from the first reset signal RST_1 to the D-th reset signal RST_D, and the pulses of the selection signals SEL are sequentially output from the first selection signal SEL_1 to the B-th selection signal SEL_B.

The photodetector circuit 103p is brought into a reset state in accordance with the input reset signal RST and then generates an optical data voltage. Supplied with a pulse of the selection signal SEL, the photodetector circuit 103p outputs the generated optical data voltage as a data signal.

Then, the reading circuit 104 sequentially reads optical data voltages output from the photodetector circuits 103p. When all the optical data voltages are read, the reading operation is completed. The read optical data voltages are used as data signals for executing predetermined processing. That is the operation in the entirely reading period.

An operation example of the input circuit in the partly reading period is described with reference to FIG. 1B. FIG. 1B illustrates the example of a method for driving the input circuit in FIG. 1A.

First, the reset signal output circuit 102 outputs the V-th (V is a natural number smaller than or equal to (D−1)) reset signal RST_V. Note that outputting a signal means starting output of a pulse of the signal in some cases. For example, as illustrated in FIG. 1B, a pulse (also referred to as P) of the first reset signal RST_1 is output in a period 151, a pulse of the second reset signal RST_2 is output in a period 152, and a pulse of the Z-th (Z is a natural number larger than or equal to 3) reset signal RST_Z is output in a period 153.

Each of the V reset signals RST is input to at least one of the plurality of photodetector circuits 103*p*. Supplied with the pulse of the reset signal RST, the photodetector circuit 103*p* is brought into a reset state and then generates an optical data voltage.

The selection signal output circuit 101 outputs the W-th (W is a natural number smaller than or equal to (B−1)) selection signal SEL_W. For example, as illustrated in FIG. 1B, a pulse of the first selection signal SEL_1 is output in the period 153, a pulse of the second selection signal SEL_2 is output in a period 154, and a pulse of the Z-th selection signal SEL_Z is output in a period 155. Note that it is preferable that the pulse of the selection signal SEL be output to the photodetector circuit 103*p* after the pulse of the reset signal RST is output to the photodetector circuit 103*p*.

Each of the W selection signals SEL is input to at least one of the plurality of photodetector circuits 103*p* brought into a reset state. Supplied with the pulse of the selection signal SEL, the photodetector circuit 103*p* outputs the generated optical data voltage as a data signal.

Further, the reset signal output circuit 102 stops output of the (V+1)-th reset signal RST_V+1. For example, after the shift register outputs the Y-th (Y is a natural number smaller than or equal to (C−1)) signal, output of either or both a clock signal or/and a power supply voltage to the shift register is stopped, whereby output of the (V+1)-th reset signal RST_V+1 is stopped. For example, as illustrated in FIG. 1B, output of the (Z+1)-th reset signal RST_Z+1 is stopped in the period 154, so that a pulse of the (Z+1)-th reset signal RST_Z+1 is not output, and the pulse of the D-th reset signal RST_D is not output in the period 155. Note that a stop of output of a signal means, for example, a stop of a pulse of the signal or input power of a voltage which does not function as a signal to a wiring for outputting a signal. A pulse generated due to noise or the like is not necessarily stopped.

Further, the selection signal output circuit 101 stops output of a pulse of the (W+1)-th selection signal SEL_W+1. For example, after the shift register outputs the X-th (X is a natural number smaller than or equal to (A−1)) signal, output of either or both a clock signal or/and a power supply voltage to the shift register is stopped, whereby output of the pulse of the (W+1)-th selection signal SEL_W+1 is stopped. For example, as illustrated in FIG. 1B, output of the (Z+1)-th selection signal SEL_Z+1 is stopped in a period 156, so that a pulse of the (W+1)-th selection signal SEL_W+1 is not output, and the pulse of the B-th selection signal SEL_B is not output in a period 157.

Each photodetector circuit 103*p* to which the selection signals SEL are not input does not output an optical data voltage.

Then, the reading circuit 104 sequentially reads optical data voltages output from part of the plurality of photodetector circuits 103*p*. When all the output optical data voltages are read, the reading operation is completed. The read optical data voltages are used as data signals for executing predetermined processing. That is the operation in the partly reading period.

Note that the entirely reading period and the partly reading period may be set appropriately. For example, a user can set the timing for performing entirely reading or the timing for performing partly reading and can perform switching between driving in the entirely reading period and driving in the partly reading period arbitrarily.

As described with reference to FIGS. 1A and 1B, in the input circuit of this embodiment, after the selection signal output circuit outputs the W-th selection signal, output of the (W+1)-th selection signal is stopped. Thus, the operation of part of the photodetector circuits can be selectively stopped, resulting in reduction in power consumption.

Further, in the case of the input circuit of this embodiment, a user can perform switching between the entirely reading operation and the partly reading operation as appropriate; therefore, power consumption can be reduced without disturbing an actual operation. For example, the partly reading operation is performed in the case where a user inputs data with the use of part of the photodetection portion, and the entirely reading operation is performed in the case where a user inputs data with the use of the whole photodetection portion. Consequently, power consumption can be reduced.

Moreover, in the input circuit of this embodiment, not only output of the selection signals but output of the reset signals can be stopped, and after outputting the V-th reset signal, the reset signal output circuit stops output of the (V+1)-th reset signal. Thus, the operation of part of the photodetector circuits can be selectively stopped, resulting in reduction in power consumption. Accordingly, power consumption can be further reduced as compared to the case where only output of the selection signals is stopped.

Embodiment 2

In this embodiment, further described is the shift register of the selection signal output circuit and the reset signal output circuit in the input circuit of the above embodiment.

Figure 2A:
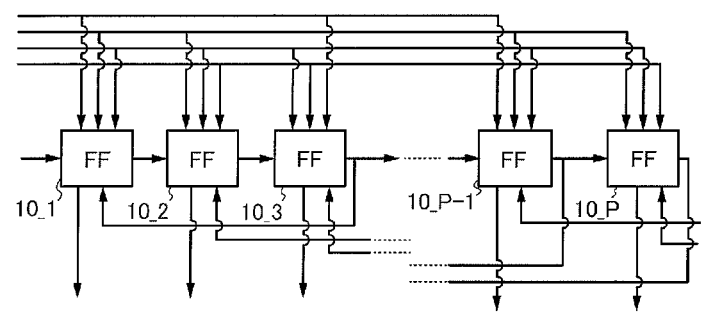
FIGS. 2A and 2B illustrate a configuration example of a shift register.
Figure 2B:
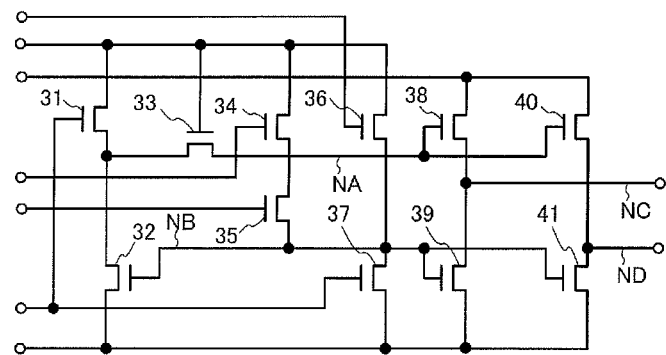

The shift register of the selection signal output circuit and the reset signal output circuit in the input circuit of the above embodiment is described with reference to FIGS. 2A and 2B. FIGS. 2A and 2B are diagrams for describing the shift register in this embodiment.

First, an example of the configuration of the shift register of the selection signal output circuit and the reset signal output circuit in the input circuit of the above embodiment is described with reference to FIG. 2A. FIG. 2A is a diagram illustrating the configuration example of the shift register.

The shift register in FIG. 2A includes P-stage (P is a natural number larger than or equal to 3) sequential circuits (also referred to as FFs).

To the shift register in FIG. 2A, a start signal SP is input as a start signal and a clock signal CLK1, a clock signal CLK2, a clock signal CLK3, and a clock signal CLK4 are input as clock signals. By using the plurality of clock signals, the speed of a signal output operation of the shift register can be increased.

The sequential circuits are described below.

Each of the sequential circuits 10_1 to 10_P is supplied with a set signal ST, a reset signal RE, a clock signal CK1, a clock signal CK2, and a clock signal CK3 and outputs a signal OUT1 and a signal OUT2. The clock signal CK1, the clock signal CK2, and the clock signal CK3 are delayed by a ¼ cycle sequentially. Note that any three of the clock signals CLK1 to CLK4 may be used as the clock signal CK1, the clock signal CK2, and the clock signal CK3. The clock signals of the same combination are not input to the sequential circuits adjacent to each other.

In addition, the circuit configuration of the sequential circuit in FIG. 2A is described with reference to FIG. 2B.

FIG. 2B is a circuit diagram illustrating the circuit configuration of the sequential circuit in FIG. 2A.

The sequential circuit in FIG. 2B includes a transistor 31, a transistor 32, a transistor 33, a transistor 34, a transistor 35, a transistor 36, a transistor 37, a transistor 38, a transistor 39, a transistor 40, and a transistor 41.

The transistors of the shift register in FIG. 2B are field-effect transistors each having at least a source, a drain, and a gate unless otherwise specified.

The source refers to all or part of a source region, a source electrode, and a source wiring. A conductive layer having a function of both a source electrode and a source wiring is referred to as a source in some cases without distinction between a source electrode and a source wiring.

The drain refers to all or part of a drain region, a drain electrode, and a drain wiring. A conductive layer having a function of both a drain electrode and a drain wiring is referred to as a drain in some cases without distinction between a drain electrode and a drain wiring.

The gate refers to all or part of a gate electrode or all or part of a gate wiring. A conductive layer having a function of both a gate electrode and a gate wiring is referred to as a gate in some cases without distinction between a gate electrode and a gate wiring.

Further, the source and the drain of the transistor may be interchanged in some cases, depending on the structure, the operating condition, or the like of the transistor.

A voltage Va is input to one of a source and a drain of the transistor 31, and the set signal ST is input to a gate of the transistor 31.

One of a source and a drain of the transistor 32 is electrically connected to the other of the source and the drain of the transistor 31, and a voltage Vb is input to the other of the source and the drain of the transistor 32.

One of a source and a drain of the transistor 33 is electrically connected to the other of the source and the drain of the transistor 31, and the voltage Va is input to a gate of the transistor 33.

The voltage Va is input to one of a source and the drain of a transistor 34, and the clock signal CK3 is input to a gate of the transistor 34.

One of a source and a drain of the transistor 35 is electrically connected to the other of the source and the drain of the transistor 34, the other of the source and the drain of the transistor 35 is electrically connected to a gate of the transistor 32, and the clock signal CK2 is input to a gate of the transistor 35.

The voltage Va is input to one of a source and a drain of the transistor 36, and the reset signal RE is input to a gate of the transistor 36.

One of a source and a drain of the transistor 37 is electrically connected to the gate of the transistor 32 and the other of the source and the drain of the transistor 36, the voltage Vb is input to the other of the source and the drain of the transistor 37, and the set signal ST is input to a gate of the transistor 37.

The clock signal CK1 is input to one of a source and a drain of the transistor 38, and a gate of the transistor 38 is electrically connected to the other of the source and the drain of the transistor 33.

One of a source and a drain of the transistor 39 is electrically connected to the other of the source and the drain of the transistor 38, the voltage Vb is input to the other of the source and the drain of the transistor 39, and a gate of the transistor 39 is electrically connected to the gate of the transistor 32.

The clock signal CK1 is input to one of a source and a drain of the transistor 40, and a gate of the transistor 40 is electrically connected to the other of the source and the drain of the transistor 33.

One of a source and a drain of the transistor 41 is electrically connected to the other of the source and the drain of the transistor 40, the voltage Vb is input to the other of the source and the drain of the transistor 41, and a gate of the transistor 41 is electrically connected to the gate of the transistor 32.

Note that one of the voltage Va and the voltage Vb is a high power supply voltage Vdd, and the other is a low power supply voltage Vss. The high power supply voltage Vdd is a voltage relatively higher than the low power supply voltage Vss. The low power supply voltage Vss is a voltage relatively lower than the high power supply voltage Vdd. The values of the voltage Va and the voltage Vb are interchanged in some cases, depending on the polarity of the transistor, or the like. The difference between the voltage Va and the voltage Vb is a power supply voltage.

In FIG. 2B, a portion where the other of the source and the drain of the transistor 33, the gate of the transistor 38, and the gate of the transistor 40 are electrically connected to one another is referred to as a node NA. A portion where the gate of the transistor 32, the other of the source and the drain of the transistor 35, the other of the source and the drain of the transistor 36, the one of the source and the drain of the transistor 37, the gate of the transistor 39, and the gate of the transistor 41 are electrically connected to one another is referred to as a node NB. A portion where the other of the source and the drain of the transistor 38 and the one of the source and the drain of the transistor 39 are electrically connected to each other is referred to as a node NC. A portion where the other of the source and the drain of the transistor 40 and the one of the source and the drain of the transistor 41 are electrically connected to each other is referred to as a node ND.

The sequential circuit in FIG. 2B outputs a voltage of the node NC and a voltage of the node ND as the signal OUT1 and the signal OUT2, respectively.

Further, the start signal SP is input as the set signal ST to the gate of the transistor 31 and the gate of the transistor 37 in the first sequential circuit 10_1.

The gate of the transistor 31 and the gate of the transistor 37 in the (Q+2)-th (Q is a natural number smaller than or equal to (P−2)) sequential circuit 10_Q+2 are electrically connected to the other of the source and the drain of the transistor 38 in the (Q+1)-th sequential circuit 10_Q+1. At that time, the signal OUT1 in the sequential circuit 10_Q+1 is the set signal ST in the sequential circuit 10_Q+2.

The other of the source and the drain of the transistor 38 in the U-th (U is a natural number larger than or equal to 3 and smaller than or equal to P) sequential circuit 10_U is electrically connected to the gate of the transistor 36 in the (U−2)-th sequential circuit 10_U−2. At that time, the signal OUT1 in the sequential circuit 10_U is the reset signal RE in the sequential circuit 10_U−2.

Further, a signal RP1 is input as a reset signal to the gate of the transistor 36 in the (P−1)-th sequential circuit 10_P−1. The signal OUT2 output from the (P−1)-th sequential circuit 10_P−1 is not necessarily used to operate the other circuits.

A signal RP2 is input as a reset signal to the gate of the transistor 36 in the P-th sequential circuit 10_P. The signal OUT2 output from the P-th sequential circuit 10_P is not necessarily used to operate the other circuits.

The transistors 31 to 41 may have the same conductivity type.

In the shift register of this embodiment, a protective circuit may be provided so as to be electrically connected to a terminal to be supplied with the high power supply voltage Vdd in each of the first to the (P−2)-th sequential circuits 10_1 to 10_P−2. By providing the protective circuit, even when the value of the voltage of the terminal is large enough to break an element due to noise or the like, breakdown of the elements in the shift register can be suppressed.

In the shift register of this embodiment, a protective circuit may be provided so as to be electrically connected to the other of the source and the drain of the transistor 38 in each of the first to the (P−2)-th sequential circuits 10_1 to 10_P−2. By providing the protective circuit, even when the value of the voltage of the signal OUT1 is large enough to break an element due to noise or the like, breakdown of the element in the circuits to which the signal OUT1 is input can be suppressed.

Figure 3A:
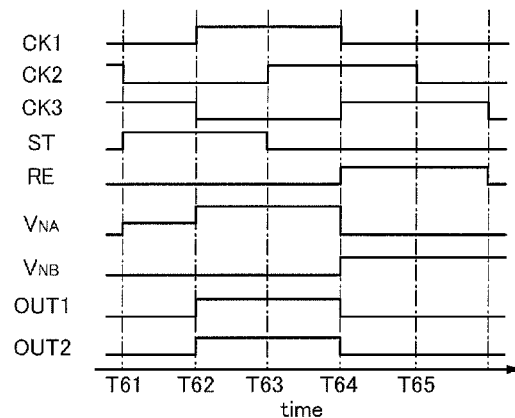
FIGS. 3A and 3B show an example of a method for driving the shift register in FIG. 2A.

In addition, an example of the operation of the sequential circuit in FIG. 2B is described with reference to FIG. 3A. FIG. 3A is a timing chart for describing the example of the operation of the sequential circuit in FIG. 2B. For example, the transistors 31 to 41 in the sequential circuit in FIG. 2B are all n-channel transistors, and the high power supply voltage Vdd and the low power supply voltage Vss are input as the voltage Va and the voltage Vb, respectively.

First, at a time T61, the clock signal CK1 is at a low level, the clock signal CK2 is changed to a low level, the clock signal CK3 is at a high level, the set signal ST is changed to a high level, and the reset signal RE is at a low level.

At that time, the sequential circuit is set to a set state. The transistor 31 and the transistor 33 are turned on, so that a voltage of the node NA (also referred to as WA) starts to change. When the voltage of the node NA is raised to be higher than the threshold voltage of the transistor 38, the transistor 38 is turned on, and when the voltage of the node NA is raised to be higher than the threshold voltage of the transistor 40, the transistor 40 is turned on. Further, the voltage of the node NA changes to be equivalent to the voltage Va. When the voltage of the node NA changes to be equivalent to the voltage Va, the transistor 33 is turned off. Since the transistor 34 is in an on state, the transistor 35 is in an off state, the transistor 36 is in an off state, and the transistor 37 is in an on state, a voltage of the node NB (also referred to as $V_{NB}$) changes to be equivalent to the voltage Vb. When the voltage of the node NB changes, the transistor 32, the transistor 39, and the transistor 41 are turned off. At that time, the signal OUT1 and the signal OUT2 are at a low level.

Next, at a time T62, the clock signal CK1 is changed to a high level, the clock signal CK2 remains at a low level, the clock signal CK3 is changed to a low level, the set signal ST remains at a high level, and the reset signal RE remains at a low level.

At that time, the transistor 31 is turned off and the transistor 33 remains in an off state, so that the node NA is brought into a floating state. At that time, the transistor 38 and the transistor 40 remain in an on state; thus, voltages of the other of the source and the drain of the transistor 38 and the other of the source and the drain of the transistor 40 are raised. Then, the voltage of the node NA is raised because of capacitive coupling due to parasitic capacitance caused between the gate and the other of the source and the drain of each of the transistor 38 and the transistor 40, which is a so-called bootstrap operation. The voltage of the node NA is raised to a value still larger than the sum of the voltage Va and the threshold voltage of the transistor 38 (also referred to as $Vth_{38}$) or the threshold voltage of the transistor 40 (also referred to as $Vth_{40}$), that is, raised to $(Va+Vth_{38}+Vx)$ or $(Va+Vth_{40}+Vx)$. At that time, the transistor 38 and the transistor 40 remain in an on state. Since the transistor 34 is turned off, the transistor 35 remains in an off state, the transistor 36 remains in an off state, and the transistor 37 remains in an on state, the transistor 32, the transistor 39, and the transistor 41 remain in an off state. Further, at that time, the signal OUT1 and the signal OUT2 are set to a high level.

Next, at a time T63, the clock signal CK1 remains at a high level, the clock signal CK2 is changed to a high level, the clock signal CK3 remains at a low level, the set signal ST is changed to a low level, and the reset signal RE remains at a low level.

At that time, the transistor 31 is turned off, so that the voltage of the node NA is kept to be much larger than the sum of the voltage Va and the threshold voltage of the transistor 38 or the threshold voltage of the transistor 40. Since the transistor 33 remains in an off state, the transistor 38 and the transistor 40 remain in an on state. Further, the transistor 34 remains in an off state, the transistor 35 remains in an off state, the transistor 36 remains in an off state, and the transistor 37 is turned off, so that the voltage of the node NB is kept to be equivalent to the voltage Vb. Thus, the transistor 32, the transistor 39, and the transistor 41 remain in an off state. Further, at that time, the signal OUT1 and the signal OUT2 remain at a high level.

Next, at a time T64, the clock signal CK1 is changed to a low level, the clock signal CK2 remains at a high level, the clock signal CK3 is changed to a high level, the set signal ST remains at a low level, and the reset signal RE is changed to a high level.

At that time, the sequential circuit is set to a reset state. The transistor 34, the transistor 35, and the transistor 36 are turned on and the transistor 37 remains in an off state; thus, the voltage of the node NB starts to change. When the voltage of the node NB is raised to be higher than the threshold voltage of the transistor 32, the transistor 32 is turned on. When the voltage of the node NB is raised to be higher than the threshold voltage of the transistor 39, the transistor 39 is turned on. When the voltage of the node NB is raised to be higher than the threshold voltage of the transistor 41, the transistor 41 is turned on. At that time, the voltage of the node NB changes to be equivalent to the voltage Vb. Further, the voltage of the one of the source and the drain of the transistor 33 changes to be equivalent to the voltage Vb, so that the transistor 33 is turned on and the voltage of the node NA starts to change. When the voltage of the node NA changes to be lower than the threshold voltage of the transistor 38, the transistor 38 is turned off, and when the voltage of the node NA changes to be lower than the threshold voltage of the transistor 40, the transistor 40 is turned off. The voltage of the node NA changes to be equivalent to the voltage Vb. At that time, the signal OUT1 and the signal OUT2 are at a low level.

Next, at a time T65, the clock signal CK1 remains at a low level, the clock signal CK2 is changed to a low level, the clock signal CK3 remains at a high level, the set signal ST remains at a low level, and the reset signal RE remains at a high level.

At that time, the transistor 34 remains in an on state, the transistor 35 is turned off, the transistor 36 remains in an on state, and the transistor 37 remains in an off state; thus, the voltage of the node NB is kept to be equivalent to the voltage Va and the transistor 32, the transistor 39, and the transistor 41 remain in an on state. At that time, the transistor 31 remains in an off state, the transistor 33 remains in an on state, and the voltage of the node NA is kept to be equivalent to the voltage Vb; thus, the transistor 38 and the transistor 40 remain in an off state. Further, at that time, the signal OUT1 and the signal OUT2 remain at a low level.

As described above, the sequential circuit can output the signal OUT1 and the signal OUT2. That is an example of the operation of the sequential circuit in FIG. 2B.

Subsequently, an example of the operation of the shift register in FIG. 2A is described.

In the case of the shift register in FIG. 2A, there are a period in which output signals are output from all of the sequential circuits (an entirely outputting period) and a period in which output of an output signal of part of the sequential circuits is stopped (a partly outputting period). The operation in each period is described below.

In the entirely outputting period, a pulse of the start signal SP is input to the first sequential circuit 10_1, whereby pulses of the signal OUT1 and the signal OUT2 are output sequentially from the first to the P-th sequential circuits 10_1 to 10_P in accordance with the clock signals CLK1 to CLK4. That is the operation in the entirely outputting period.

Figure 3B:
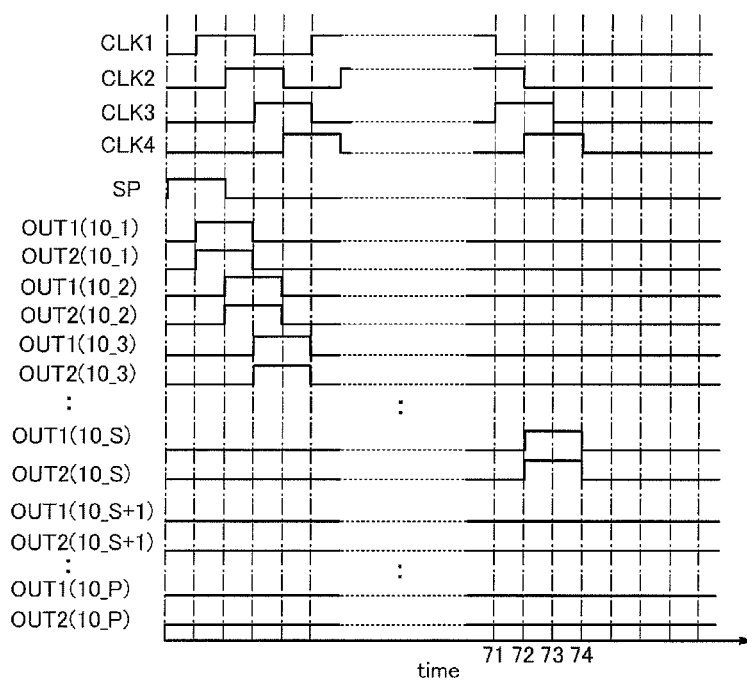

Further, the operation in the partly outputting period is described with reference to FIG. 3B. FIG. 3B is a timing chart showing an example of the operation of the shift register in FIG. 2A.

As illustrated in FIG. 3B, in the shift register in FIG. 2A, when the pulse of the start signal SP is input to the first sequential circuit 10_1, the first to the S-th (S is a natural number larger than or equal to 4 and smaller than or equal to (P−2)) sequential circuits 10_1 to 10_S sequentially output the pulses of the signals OUT1 and the signals OUT2 in accordance with the clock signals CLK1 to CLK4.

Further, at a time 71, output of the clock signal CLK1 to the shift register is stopped. At a time 72, output of the clock signal CLK2 to the shift register is stopped. At a time 73, output of the clock signal CLK3 to the shift register is stopped. At a time 74, output of the clock signal CLK4 to the shift register is stopped.

Then, stopped is output of the pulses of the signals OUT1 and the signals OUT2 from the (S+1)-th to the P-th sequential circuits 10_S+1 to 10_P.

Note that in the shift register of this embodiment, output of the power supply voltage may be stopped before output of the clock signals CLK1 to CLK4 is stopped.

In the shift register of this embodiment, after the output of the clock signals CLK1 to CLK4 is stopped, the output of the clock signals CLK1 to CLK4 may be resumed.

As described with reference to FIGS. 2A and 2B and FIGS. 3A and 3B, the shift register of this embodiment includes the sequential circuits of the plurality of stages. Each of the plurality of sequential circuits includes a first transistor, a second transistor, and a third transistor. The first transistor has a gate to which a set signal is input and controls whether to turn on the second transistor in accordance with the set signal. The second transistor has a source and a drain one of which is supplied with a clock signal and controls whether to set the voltage of an output signal from the sequential circuit to a value corresponding to the voltage of the clock signal. The third transistor has a gate to which a reset signal is input and controls whether to turn off the second transistor in accordance with the reset signal. With such a structure, output of the clock signal to the sequential circuit can be stopped easily to stop output of a signal from the sequential circuit.

For example, the shift register of this embodiment can be used for the reset signal output circuit of the above embodiment. Thus, after the selection signals up to and including the V-th selection signal are output, output of the (V+1)-th selection signal can be stopped. Further, with the structure, when output of both or either the clock signal and/or the power supply voltage to the shift register is stopped, output of part of the output signals of the shift register can be stopped.

Moreover, the shift register of this embodiment can be used for the selection signal output circuit of the above embodiment. Thus, after the selection signals up to and including the W-th selection signal are output, output of the (W+1)-th selection signal can be stopped. Further, with the structure, when output of both or either the clock signal and/or the power supply voltage to the shift register is stopped, output of part of the output signals of the shift register can be stopped.

Embodiment 3

In this embodiment, further described is the shift register of the selection signal output circuit and the reset signal output circuit in the input circuit of the above embodiment.

Figure 4A:
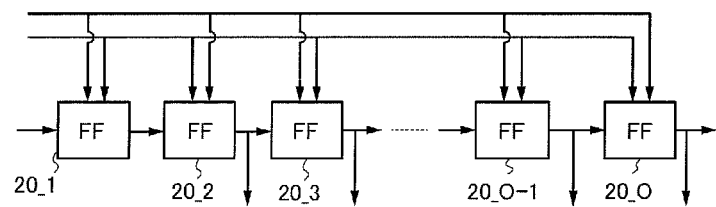
FIGS. 4A to 4C illustrate a configuration example of a shift register.
Figure 4B:
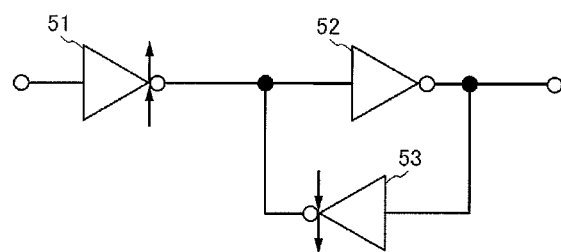
Figure 4C:
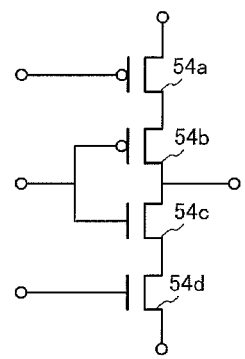

The shift register of the selection signal output circuit and the reset signal output circuit in the input circuit of the above embodiment may have a structure different from that in Embodiment 2. A configuration example of the shift register of the selection signal output circuit and the reset signal output circuit in the input circuit of the above embodiment is described with reference to FIGS. 4A to 4C. FIGS. 4A to 4C are diagrams for describing a configuration example of the shift register.

First, the configuration example of the shift register of the selection signal output circuit and the reset signal output circuit in the input circuit of the above embodiment are described with reference to FIG. 4A. FIG. 4A is a diagram illustrating the configuration example of the shift register.

The shift register in FIG. 4A includes O (O is a natural number) sequential circuits of O stages.

To the shift register in FIG. 4A, the start signal SP is input as a start signal and a clock signal CLK11 and a clock signal CLK12 are input as clock signals.

Each of the sequential circuits 20_1 to 20_O is supplied with the set signal ST, the clock signal CK1, and the clock signal CK2, and outputs a signal OUT11. As the clock signal CK1, one of the clock signal CLK11 and the clock signal CLK12 can be used. As the clock signal CK2, the other of the clock signal CLK11 and the clock signal CLK12 can be used. As the clock signal CLK12, for example, an inverted clock signal of the clock signal CLK11 can be used. The clock signals serving as the clock signal CK1 and the clock signal CK2 are alternately input to the sequential circuits adjacent to each other.

In addition, the circuit configuration of the sequential circuit in FIG. 4A is described with reference to FIG. 4B. FIG. 4B is a circuit diagram illustrating the circuit configuration of the sequential circuit in FIG. 4A.

The sequential circuit in FIG. 4B includes a clocked inverter 51, an inverter 52, and a clocked inverter 53.

The clocked inverter 51 has a data signal input terminal and a data signal output terminal. The clocked inverter 51 is supplied with the set signal ST through the data signal input terminal and then supplied with the clock signal CK1 and the clock signal CK2 through the data signal input terminal.

The inverter 52 has a data signal input terminal and a data signal output terminal. The data signal input terminal of the inverter 52 is electrically connected to the data signal output terminal of the clocked inverter 51. The inverter 52 outputs as the signal OUT11 a voltage depending on a voltage input through the data signal input terminal, through the data signal output terminal.

The clocked inverter 53 has a data signal input terminal and a data signal output terminal. The data signal input terminal of the clocked inverter 53 is electrically connected to the data signal output terminal of the inverter 52. The data signal output terminal of the clocked inverter 53 is electrically connected to the data signal output terminal of the clocked inverter 51.

In addition, an example of the circuit configuration of the clocked inverter of the sequential circuit in FIG. 4B is described with reference to FIG. 4C. FIG. 4C is a circuit diagram illustrating the example of the circuit configuration of the clocked inverter.

The clocked inverter in FIG. 4C includes a transistor 54a, a transistor 54b, a transistor 54c, and a transistor 54d.

The transistors of the clocked inverter in FIG. 4C are field-effect transistors each having at least a source, a drain, and a gate unless otherwise specified.

The clock signal CK1 is input to a gate of the transistor 54a, and the voltage Va is input to one of a source and a drain of the transistor 54a. The transistor 54a is a p-channel transistor.

One of a source and a drain of the transistor 54b is electrically connected to the other of the source and the drain of the transistor 54a. The transistor 54b is a p-channel transistor.

One of a source and a drain of the transistor 54c is electrically connected to the other of the source and the drain of the transistor 54b. The transistor 54c is an n-channel transistor.

The clock signal CK2 is input to a gate of the transistor 54d. One of a source and a drain of the transistor 54d is electrically connected to the other of the source and the drain of the transistor 54c. The voltage Vb is input to the other of the source and the drain of the transistor 54d. The transistor 54d is an n-channel transistor.

In the clocked inverter in FIG. 4C, a gate of the transistor 54b and a gate of the transistor 54c function as the data signal input terminals, and the other of the source and the drain of the transistor 54b and the one of the source and the drain of the transistor 54c function as the data signal output terminals.

Further, an example of the operation of the shift register in FIG. 4A is described. It is assumed that the high power supply voltage Vdd and the low power supply voltage Vss are input as the voltage Va and the voltage Vb, respectively.

In the case of the shift register in FIG. 4A, there are an entirely outputting period and a partly outputting period. The operation in each period is described below.

In the entirely outputting period, when a power supply voltage Vp is input to the shift register and a pulse of the start signal SP is input to the first sequential circuit 20_1, pulses of the signals OUT11 are output sequentially from the first to the O-th sequential circuits 20_1 to 20_O in accordance with the clock signals CLK11 and CLK12. That is the operation in the entirely outputting period.

Figure 5:
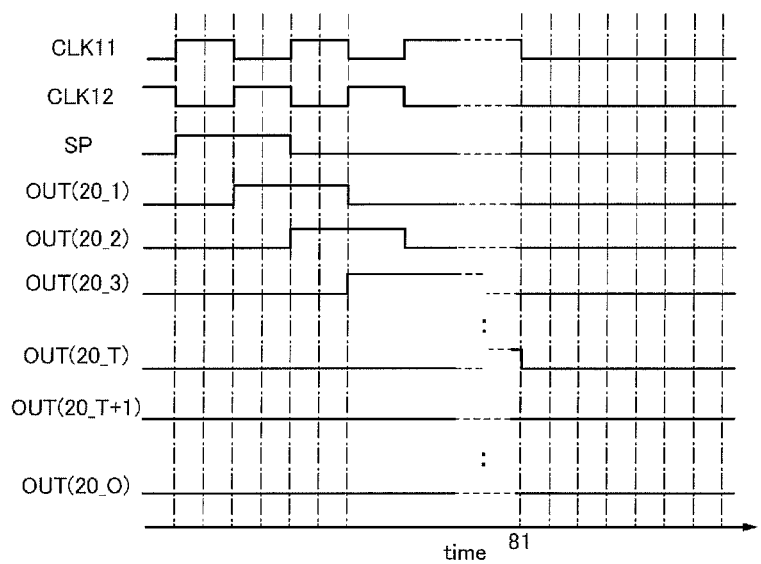
FIG. 5 shows an example of a method for driving the shift register in FIG. 4A.

Further, the operation in the partly outputting period is described with reference to FIG. 5. FIG. 5 is a timing chart showing an example of the operation of the shift register in FIG. 4A.

When the power supply voltage Vp is input to the shift register in FIG. 4A and as illustrated in FIG. 5, the pulse of the start signal SP is input to the first sequential circuit 20_1 of the shift register in FIG. 4A, the first to the T-th (T is a natural number larger than or equal to 3 and smaller than or equal to (O−2)) sequential circuits 20_1 to 20_T sequentially output pulses of output signals in accordance with the clock signals CLK11 and CLK12.

Further, at a time 81, output of the clock signal CLK11 and the clock signal CLK 12 to the shift register is stopped. At the same time, the output of the power supply voltage Vp to the shift register is also stopped. When the output of the power supply voltage Vp to the shift register is stopped, power consumption can be further reduced.

Then, stopped is output of the pulses of the signals OUT11 from the (T+1)-th to the O-th sequential circuits 20_T+1 to 20_O.

In the shift register of this embodiment, after the output of the clock signals CLK11 and CLK12 is stopped, the output of the clock signals CLK11 and CLK12 may be resumed.

As described with reference to FIGS. 4A to 4C and FIG. 5, the shift register of this embodiment includes the clocked inverters. With such a structure, output of the power supply voltage and the clock signal to the sequential circuit can be stopped easily to stop output of an output signal.

For example, the shift register of this embodiment can be used for the reset signal output circuit of the above embodiment. Thus, after the selection signals up to and including the V-th selection signal are output, output of the (V+1)-th selection signal can be stopped. Further, with the structure, when output of the clock signal and the power supply voltage to the shift register is stopped, output of part of the output signals of the shift register can be stopped.

Moreover, the shift register of this embodiment can be used for the selection signal output circuit of the above embodiment. Thus, after the selection signals up to and including the W-th selection signal are output, output of the (W+1)-th selection signal can be stopped. Further, with the structure, when output of the clock signal and the power supply voltage to the shift register is stopped, output of part of the output signals of the shift register can be stopped.

Embodiment 4

In this embodiment, the photodetector circuit in the input circuit of the above embodiment is further described.

The photodetector circuit in the input circuit of the above embodiment is described with reference to FIGS. 6A to 6F. FIGS. 6A to 6F are diagrams for describing the photodetector circuit.

Figure 6A:
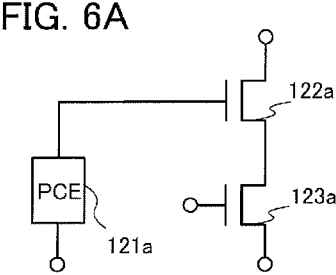
FIGS. 6A to 6F illustrate photodetector circuits and timing charts thereof.
Figure 6D:
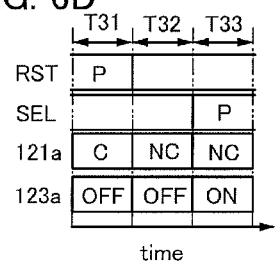
Figure 6B:
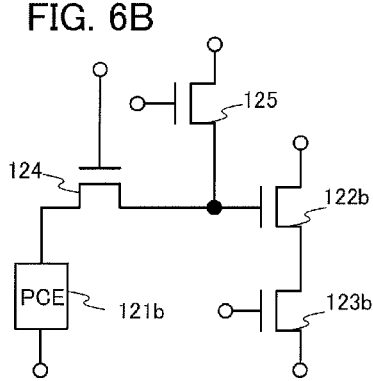
Figure 6E:
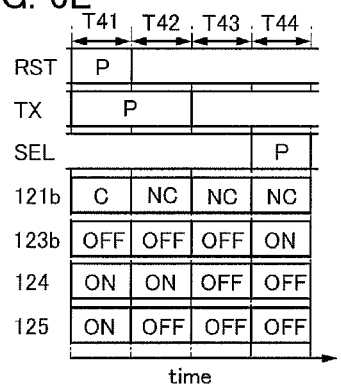
Figure 6C:
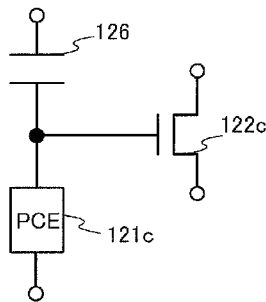

First, configuration examples of the photodetector circuit of this embodiment are described with reference to FIGS. 6A to 6C. FIGS. 6A to 6C are diagrams each illustrating the configuration example of the photodetector circuit of this embodiment.

The photodetector circuit in FIG. 6A includes a photoelectric conversion element 121a, a transistor 122a, and a transistor 123a.

The transistors of the photodetector circuit in FIG. 6A are field-effect transistors each having at least a source, a drain, and a gate unless otherwise specified.

The photoelectric conversion element 121a has a first terminal and a second terminal. The reset signal RST is input to the first terminal of the photoelectric conversion element 121a.

A gate of the transistor 122a is electrically connected to the second terminal of the photoelectric conversion element 121a.

One of a source and a drain of the transistor 123a is electrically connected to one of a source and a drain of the transistor 122a. The selection signal SEL is input to a gate of the transistor 123a.

The voltage Va is input to one of the other of the source and the drain of the transistor 122a and the other of the source and the drain of the transistor 123a.

In addition, the photodetector circuit in FIG. 6A outputs the voltage of the other of the other of the source and the drain of the transistor 122a and the other of the source and the drain of the transistor 123a, as a data signal. The voltage of the other of the other of the source and the drain of the transistor 122a and the other of the source and the drain of the transistor 123a at that time is an optical data voltage.

The photodetector circuit in FIG. 6B includes a photoelectric conversion element 121b, a transistor 122b, a transistor 123b, a transistor 124, and a transistor 125.

The transistors of the photodetector circuit in FIG. 6B are field-effect transistors each having at least a source, a drain, and a gate unless otherwise specified.

The photoelectric conversion element 121b has a first terminal and a second terminal. The voltage Vb is input to the first terminal of the photoelectric conversion element 121b.

A charge accumulation control signal TX is input to a gate of the transistor 124. One of a source and a drain of the transistor 124 is electrically connected to the second terminal of the photoelectric conversion element 121b.

A gate of the transistor 122b is electrically connected to the other of the source and the drain of the transistor 124.

The reset signal RST is input to a gate of the transistor 125. The voltage Va is input to one of a source and a drain of the transistor 125. The other of the source and the drain of the transistor 125 is electrically connected to the other of the source and the drain of the transistor 124.

The selection signal SEL is input to a gate of the transistor 123b. One of a source and a drain of the transistor 123b is electrically connected to one of a source and a drain of the transistor 122b.

The voltage Va is input to one of the other of the source and the drain of the transistor 122b and the other of the source and the drain of the transistor 123b.

In addition, the photodetector circuit in FIG. 6B outputs the voltage of the other of the other of the source and the drain of the transistor 122b and the other of the source and the drain of the transistor 1236, as a data signal. The voltage of the other of the other of the source and the drain of the transistor 122b and the other of the source and the drain of the transistor 123b at that time is an optical data voltage.

The photodetector circuit in FIG. 6C includes a photoelectric conversion element 121c, a transistor 122c, and a capacitor 126.

The transistor of the photodetector circuit in FIG. 6C is a field-effect transistor having at least a source, a drain, and a gate unless otherwise specified.

The photoelectric conversion element 121c has a first terminal and a second terminal. The reset signal RST is input to the first terminal of the photoelectric conversion element 121c.

The capacitor 126 has a first terminal and a second terminal. The selection signal SEL is input to the first terminal of the capacitor 126. The second terminal of the capacitor 126 is electrically connected to the second terminal of the photoelectric conversion element 121c.

A gate of the transistor 122c is electrically connected to the second terminal of the photoelectric conversion element 121c. The voltage Va is input to one of a source and a drain of the transistor 122c.

The photodetector circuit in FIG. 6C outputs the voltage of the other of the source and the drain of the transistor 122c, as a data signal. The voltage of the other of the source and the drain of the transistor 122c at that time is an optical data voltage.

The photoelectric conversion elements 121a to 121c each have a function of generating a current corresponding to the illuminance of incident light when light enters the photoelectric conversion element. As the photoelectric conversion elements 121a to 121c, photodiodes, phototransistors, or the like can be used. When the photoelectric conversion elements 121a to 121c are photodiodes, one of an anode and a cathode of the photodiode corresponds to the first terminal of the photoelectric conversion element, and the other of the anode and the cathode of the photodiode corresponds to the second terminal of the photoelectric conversion element. When the photoelectric conversion elements 121a to 121c are phototransistors, one of a source and a drain of the phototransistor corresponds to the first terminal of the photoelectric conversion element, and the other of the source and the drain of the phototransistor corresponds to the second terminal of the photoelectric conversion element. Note that in the photodiode, a conducting state (also referred to as the state C) is a state where a forward voltage is applied and a current flows between the first terminal and the second terminal, while a nonconducting state (also referred to as the state NC) is a state where a reverse voltage is applied, so that a forward current does not flow. In addition, when the photodiode is in a nonconducting state, light incident thereon may cause a current to flow between the first terminal and the second terminal. In the phototransistor, a conducting state refers to an on state (also referred to as the state ON), while a nonconducting state refers to an off state (also referred to as the state OFF). In addition, when the phototransistor is in a nonconducting state, light incident thereon may cause a current to flow between the first terminal and the second terminal.

The transistors 122a to 122c each have a function of an amplifying transistor for setting an output signal (optical data voltage) of the photodetector circuit. As the transistors 122a to 122c, it is possible to use transistors each including as a channel formation layer, for example, a semiconductor layer including a semiconductor belonging to Group 14 of the periodic table (e.g., silicon) or an oxide semiconductor layer. The oxide semiconductor layer of the transistor, which has a function of the channel formation layer, is a semiconductor layer highly purified to be intrinsic (also referred to as I-type) or substantially intrinsic. Note that the high purification means at least one of the following concepts: removal of hydrogen from an oxide semiconductor layer as much as possible; and reduction of defects, which are caused by oxygen deficiency in an oxide semiconductor layer, by supply of oxygen to the oxide semiconductor layer.

By being turned on or off in accordance with the charge accumulation control signal TX, the transistor 124 controls whether to set the voltage of the gate of the transistor 122b to a voltage corresponding to a photocurrent generated by the photoelectric conversion element 121b. The charge accumulation control signal TX can be generated by a shift register, for example. Note that in the photodetector circuit of this embodiment, the transistor 124 is not necessarily provided; however, in the case of providing the transistor 124, the voltage of the gate of the transistor 122b can be held for a certain period of time when the gate of the transistor 122b is in a floating state.

The transistor 125 controls whether to reset the voltage of the gate of the transistor 122b to the voltage Va by being turned on or off in accordance with the reset signal RST. Note that in the photodetector circuit of this embodiment, the transistor 125 is not necessarily provided; however, in the case of providing the transistor 125, the voltage of the gate of the transistor 122*b* can be reset to the desired voltage.

The off-state current of the transistor 124 and the transistor 125 is preferably low and for example, the off-state current per micrometer in channel width is preferably 10 aA ($1\times10^{-17}$ A) or less, more preferably 1 aA ($1\times10^{-18}$ A) or less, still more preferably 10 zA ($1\times10^{-25}$ A) or less, further preferably 1 zA ($1\times10^{-21}$ A) or less. The use of a transistor with low off-state current as each of the transistor 124 and the transistor 125 can suppress variation in voltage of the gate of the transistor 122*b* due to leakage current of the transistor 124 and the transistor 125. As the transistor with low off-state current, a transistor including an oxide semiconductor layer as a channel formation layer can be used, for example. The oxide semiconductor layer of the transistor, which has a function of the channel formation layer, is a semiconductor layer highly purified to be intrinsic (also referred to as I-type) or substantially intrinsic.

The transistors 123*a* and 123*b* each controls whether to output the optical data voltage as a data signal from the photodetector circuit by being turned on or off in accordance with the selection signal SEL. As the transistors 123*a* and 123*b*, it is possible to use transistors each including as a channel formation layer, for example, a semiconductor layer or an oxide semiconductor layer including a semiconductor belonging to Group 14 of the periodic table (e.g., silicon or germanium). The oxide semiconductor layer of the transistor, which has a function of the channel formation layer, is a semiconductor layer highly purified to be intrinsic (also referred to as I-type) or substantially intrinsic.

Subsequently, described are examples of methods for driving the photodetector circuits in FIGS. 6A to 6C.

First, the example of the method for driving the photodetector circuit in FIG. 6A is described with reference to FIG. 6D. FIG. 6D is a diagram for describing the example of the method for driving the photodetector circuit in FIG. 6A and shows states of the reset signal RST, the selection signal SEL, the photoelectric conversion element 121*a*, and the transistor 123*a*.

In the example of the method for driving the photodetector circuit in FIG. 6A, first, in a period T31, a pulse of the reset signal RST is input.

At that time, the photoelectric conversion element 121*a* is brought into a conducting state and the transistor 123*a* is turned off.

At that time, the voltage of the gate of the transistor 122*a* is reset to a certain value.

Then, in a period T32 after input of the pulse of the reset signal RST, the photoelectric conversion element 121*a* is brought into a nonconducting state and the transistor 123*a* remains in an off state.

At that time, a photocurrent flows between the first terminal and the second terminal of the photoelectric conversion element 121*a* in accordance with the illuminance of light incident on the photoelectric conversion element 121*a*. Further, the voltage value of the gate of the transistor 122*a* varies depending on the photocurrent.

Then, in the period T33, a pulse of the selection signal SEL is input.

At that time, the photoelectric conversion element 121*a* remains in a nonconducting state, the transistor 123*a* is turned on, a current flows through the source and the drain of the transistor 122*a* and the source and the drain of the transistor 123*a*, and the photodetector circuit in FIG. 6A outputs as a data signal the voltage of the other of the other of the source and the drain of the transistor 122*a* and the other of the source and the drain of the transistor 123*a*. That is the example of the method for driving the photodetector circuit in FIG. 6A.

Next, the example of the method for driving the photodetector circuit in FIG. 6B is described with reference to FIG. 6E. FIG. 6E is a diagram for describing the example of the method for driving the photodetector circuit in FIG. 6B.

In the example of the method for driving the photodetector circuit in FIG. 6B, first, in a period T41, a pulse of the reset signal RST is input. In addition, in the period T41 and a period T42, a pulse of the charge accumulation control signal TX is input. Note that in the period T41, the timing for starting input of the pulse of the reset signal may be earlier than the timing for starting input of the pulse of the charge accumulation control signal TX.

At that time, first, in the period T41, the photoelectric conversion element 121*b* is brought into a conducting state so that the transistor 124 is turned on, whereby the voltage of the gate of the transistor 122*b* is reset to a value equivalent to the voltage Va.

Then, in the period T42 after input of the pulse of the reset signal RST, the photoelectric conversion element 121*b* is brought into a nonconducting state, the transistor 124 remains in an on state, and the transistor 125 is turned off.

At that time, a photocurrent flows between the first terminal and the second terminal of the photoelectric conversion element 121*b* in accordance with the illuminance of light incident on the photoelectric conversion element 121*b*. Further, the voltage value of the gate of the transistor 122*b* varies depending on the photocurrent.

Then, in a period T43 after input of the pulse of the charge accumulation control signal TX, the transistor 124 is turned off.

At that time, the voltage of the gate of the transistor 122*b* is kept to be a value corresponding to a photocurrent of the photoelectric conversion element 121*b* in the period T42. Note that the period T43 is not necessary; however, in the case where there is the period T43, the timing for the photodetector circuit to output an optical data voltage as a data signal can be set appropriately. For example, the timing for each of the plurality of photodetector circuits to output an optical data voltage as a data signal can be set appropriately.

Then, in a period T44, a pulse of the selection signal SEL is input.

At that time, the photoelectric conversion element 121*b* remains in a nonconducting state and the transistor 123*b* is turned on.

Further, at that time, a current flows though the source and the drain of the transistor 122*b* and the source and the drain of the transistor 123*b*, and the photodetector circuit in FIG. 6B outputs as a data signal the voltage of the other of the other of the source and the drain of the transistor 122*b* and the other of the source and the drain of the transistor 123*b*. That is the example of the method for driving the photodetector circuit in FIG. 6B.

Figure 6F:
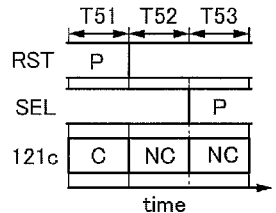

Next, the example of the method for driving the photodetector circuit in FIG. 6C is described with reference to FIG. 6F. FIG. 6F is a diagram for describing the example of the method for driving the photodetector circuit in FIG. 6C.

In the example of the method for driving the photodetector circuit in FIG. 6C, first, in a period T51, a pulse of the reset signal RST is input.

At that time, the photoelectric conversion element 121*c* is brought into a conducting state and the voltage of the gate of the transistor 122*c* is reset to a certain value.

Then, in a period T52 after input of the pulse of the reset signal RST, the photoelectric conversion element 121c is brought into a nonconducting state.

At that time, a photocurrent flows between the first terminal and the second terminal of the photoelectric conversion element 121c in accordance with the illuminance of light incident on the photoelectric conversion element 121c. Further, the voltage of the gate of the transistor 122c varies depending on the photocurrent.

Then, in a period T53, a pulse of the selection signal SEL is input.

At that time, the photoelectric conversion element 121c remains in a nonconducting state, a current flows between the source and the drain of the transistor 122c, and the photodetector circuit in FIG. 6C outputs as a data signal the voltage of the other of the source and the drain of the transistor 122c. That is the example of the method for driving the photodetector circuit in FIG. 6C.

As described with reference to FIGS. 6A to 6F, the photodetector circuit of the above embodiment includes the photoelectric conversion element and the amplifying transistor. The photodetector circuit outputs an optical data voltage as a data signal in accordance with the selection signal. With such a structure, for example, input of the selection signal can be stopped to stop output of the optical data voltage from the photodetector circuit; therefore, output of the optical data voltage of part of the photodetector circuits can be selectively stopped.

Embodiment 5

In this embodiment, described is an input-output device that can output data and can input data when light enters the input-output device.

Figure 7A:
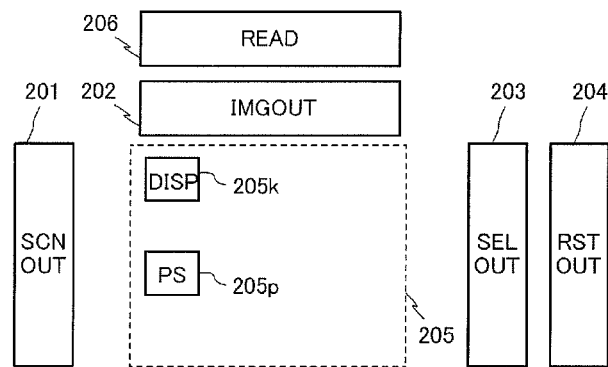
FIGS. 7A and 7B illustrate an example of an input-output device in Embodiment 5.
Figure 7B:
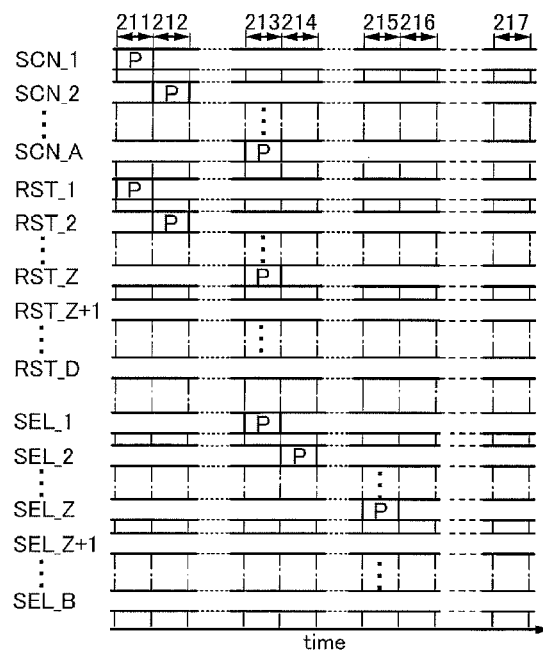

An example of the input-output device in this embodiment is described with reference to FIGS. 7A and 7B. FIGS. 7A and 7B are diagrams for describing the example of the input-output device in this embodiment.

First, an example of the configuration of the input-output device in this embodiment is described with reference to FIG. 7A. FIG. 7A is a block diagram illustrating the configuration example of the input-output device in this embodiment.

The input-output device in FIG. 7A includes a scan signal output circuit (also referred to as SCNOUT) 201, an image signal output circuit (also referred to as IMGOUT) 202, a selection signal output circuit 203, a reset signal output circuit 204, a plurality of display circuits (also referred to as DISP) 205k, a plurality of photodetector circuits 205p, and a reading circuit 206.

The scan signal output circuit 201 has a function of outputting a scan signal SCN. The scan signal output circuit 201 selects the display circuit 205k to which an image signal IMG is to be input, in accordance with the scan signal SCN. The scan signal output circuit 201 includes, for example, a shift register. A start signal, a clock signal, and a power supply voltage are input to the shift register and the shift register outputs a signal, whereby the scan signal output circuit 201 can output the scan signal SCN. As the shift register, a shift register applicable to the selection signal output circuit or the reset signal output circuit in the above embodiment can be used, for example.

The image signal output circuit 202 has a function of outputting the image signal IMG. The image signal output circuit 202 outputs the image signal IMG to the display circuit 205k selected by the scan signal output circuit 201. The image signal output circuit 202 includes, for example, a shift register and an analog switch. A start signal, a clock signal, and a power supply voltage are input to the shift register, and the shift register outputs a signal to the analog switch. When the analog switch is turned on in accordance with the output signal of the shift register, the image signal output circuit 202 can output the image signal IMG. As the shift register, a shift register applicable to the selection signal output circuit or the reset signal output circuit in the above embodiment can be used, for example.

The selection signal output circuit 203 includes a shift register, and a start signal, a clock signal, and a power supply voltage are input to the shift register. When the shift register outputs A signals, the selection signal output circuit 203 outputs the B selection signals SEL. The selection signal SEL is for controlling whether the photodetector circuit 205p outputs a signal. For example, the A signals output from the shift register may be output as the selection signals SEL. Alternatively, the A signals may be output from the shift register to a logic circuit and output signals of the logic circuit may be the selection signals SEL.

The reset signal output circuit 204 includes a shift register, and a start signal, a clock signal, and a power supply voltage are input to the shift register. When the shift register outputs C signals, the reset signal output circuit 204 outputs the D reset signals RST. When the reset signal output circuit 204 is provided, the photodetector circuit 205p can be brought into a reset state. The reset signal RST is for controlling whether the photodetector circuit 205p is reset. For example, the C signals output from the shift register may be output as the reset signals RST. Alternatively, the C signals may be output from the shift register to a logic circuit and output signals of the logic circuit may be the reset signals RST.

The scan signal SCN is input to the display circuit 205k and then the image signal IMG is input to the display circuit 205k in accordance with the input scan signal SCN. The display circuit 205k changes the display state depending on the input image signal IMG.

The display circuit includes, for example, a selecting transistor and a display element. The selecting transistor controls whether to output the image signal IMG to the display element by being turned on or off in accordance with the scan signal SCN. The display element changes the display state in accordance with the input image signal IMG.

As the display element of the display circuit, a liquid crystal element, a light-emitting element, or the like can be used. A liquid crystal element is an element whose light transmittance is changed by voltage application, and a light-emitting element is an element whose luminance is controlled with a current or a voltage. As the light-emitting element, an electroluminescent element (also referred to as an EL element) or the like may be used.

The photodetector circuit 205p generates a voltage corresponding to the illuminance of incident light when light enters the photodetector circuit 205p.

Supplied with one of the D reset signals RST, the photodetector circuit 205p is brought into a reset state in accordance with the supplied reset signal RST.

Further, supplied with one of the B selection signals SEL, the photodetector circuit 205p outputs an optical data voltage as a data signal in accordance with the supplied selection signal SEL.

As the photodetector circuit 205p, for example, a photodetector circuit applicable to the input circuit of the above embodiment can be used.

Note that a pixel portion 205 is a region from which data is output and to which data is externally input by detection of light. For example, the pixel portion 205 may be formed in such a manner that pixels each including one or more display circuits 205k and one or more photodetector circuits 205p are arranged in matrix. Alternatively, a display circuit portion including the plurality of display circuits 205k arranged in matrix and a photodetection portion including the plurality of photodetector circuits 205p arranged in matrix may be separately provided in the pixel portion.

The reading circuit 206 has a function of sequentially selecting the plurality of photodetector circuits 205p to read an optical data voltage output from the selected photodetector circuit 205p as a data signal.

For example, a selection circuit may be used for the reading circuit 206. Supplied with a reading selection signal, the selection circuit selects the photodetector circuit 205p from which an optical data signal is to be read, in accordance with the input reading selection signal. Note that the selection circuit may select a plurality of the photodetector circuits 205p, from which optical data voltages are read, at one time. The selection circuit may include, for example, a plurality of transistors so that the photodetector circuit 205p from which an optical data voltage is to be read can be selected when the plurality of transistors are turned on or off.

Note that for example, a control circuit enables control of operations of the scan signal output circuit 201, the image signal output circuit 202, the selection signal output circuit 203, the reset signal output circuit 204, and the reading circuit 206.

The control circuit has a function of outputting a control signal that is a pulse signal. The control signal is output to the scan signal output circuit 201, the image signal output circuit 202, the selection signal output circuit 203, and the reset signal output circuit 204, whereby the operations of the scan signal output circuit 201, the image signal output circuit 202, the selection signal output circuit 203, and the reset signal output circuit 204 can be controlled in accordance with a pulse of the control signal. For example, output of a start signal, a clock signal, or a power supply voltage to the shift register of the selection signal output circuit 203 or the reset signal output circuit 204 can be started or stopped in accordance with the pulse of the control signal. The control circuit may be controlled using a CPU, for example. For example, an interval between pulses of control signals generated by the control circuit may be set using a CPU. Further, the reading circuit 206 may be controlled in accordance with the pulse of the control signal.

The operations of the scan signal output circuit 201, the image signal output circuit 202, the selection signal output circuit 203, and the reset signal output circuit 204 may be controlled in accordance with not only the control circuit but an operation signal. For example, when an operation signal is input to the control circuit through an interface, the control circuit generates control signals whose pulse intervals are set in accordance with the input operation signal, and the generated control signal is output to the scan signal output circuit 201, the image signal output circuit 202, the selection signal output circuit 203, and the reset signal output circuit 204. Further, the reading circuit 206 may be controlled in accordance with a pulse of the operation signal.

Next, an example of a method for driving the input-output device in FIG. 7A is described as an example of a method for driving the input-output device in this embodiment.

In the example of a method for driving the input-output device in FIG. 7A, a displaying operation and a reading operation are performed.

First, the displaying operation is described. To begin with, pulses of the first to the A-th scan signals SCN_1 to SCN_A are sequentially output.

Further, supplied with the pulse of the scan signal SCN, the display circuit 205k is supplied with the image signal IMG.

The display element of the display circuit 205k to which the image signal IMG has been input is brought into a display state depending on a voltage of the image signal IMG. That is the displaying operation.

In addition, the reading operation is described. In the reading operation, there are an entirely reading period and a partly reading period.

First, described is the operation in the entirely reading period.

In the entirely reading period, output of pulses of the reset signals RST are started sequentially from the first reset signal RST_1. After that, output of pulses of the selection signals SEL are started sequentially from the first selection signal SEL_1. Thus, the pulses of the first to the D-th reset signals RST_1 to RST_D are sequentially output, and the pulses of the first to the B-th selection signals SEL_1 to SEL_B are sequentially output.

The photodetector circuit 205p is brought into a reset state when the pulse of the reset signal RST is input thereto and then generates an optical data voltage. Supplied with a pulse of the selection signal SEL, the photodetector circuit 205p outputs the generated optical data voltage as a data signal.

Then, the reading circuit 206 sequentially reads optical data voltages output from the photodetector circuits 205p. When all the optical data voltages are read, the reading operation is completed. The read optical data voltages are used as data signals for executing predetermined processing. That is the operation in the entirely reading period.

The operation in the partly reading period is described with reference to FIG. 7B. FIG. 7B illustrates the example of a method for driving the input-output device in FIG. 7A.

First, the reset signal output circuit 204 outputs the V-th reset signal RST_V. For example, as illustrated in FIG. 7B, a pulse of the first reset signal RST_1 is output in a period 211, a pulse of the second reset signal RST_2 is output in a period 212, and a pulse of the Z-th reset signal RST_Z is output in a period 213. In addition, at that time, as illustrated in FIG. 7B, a pulse of the first scan signal SCN_1 may be output in the period 211, a pulse of the second scan signal SCN_2 may be output in the period 212, and a pulse of the A-th scan signal SCN_A may be output in the period 213. Note that the timing when the pulse of the first scan signal SCN_1 is output may be different from the timing when the pulse of the first reset signal RST_1 is output.

Each of the V reset signals RST is input to at least one of the plurality of photodetector circuits 205p. Supplied with the pulse of the reset signal RST, the photodetector circuit 205p is brought into a reset state and then generates an optical data voltage.

The selection signal output circuit 203 outputs the W-th selection signal SEL_W. For example, as illustrated in FIG. 7B, a pulse of the first selection signal SEL_1 is output in the period 213, a pulse of the second selection signal SEL_2 is output in a period 214, and a pulse of the Z-th selection signal SEL_Z is output in a period 215. Note that it is preferable that the pulse of the selection signal SEL be output to the photodetector circuit after the pulse of the reset signal RST is output to the photodetector circuit.

Each of the W selection signals SEL is input to at least one of the plurality of photodetector circuits 205p brought into a reset state. Supplied with the pulse of the selection signal SEL, the photodetector circuit 205p outputs the generated optical data voltage as a data signal.

Further, the reset signal output circuit 204 stops output of the (V+1)-th reset signal RST_V+1. For example, after the shift register outputs the Y-th signal, output of either or both a clock signal or/and a power supply voltage to the shift register is stopped, whereby output of the (V+1)-th reset signal RST_V+1 is stopped. For example, as illustrated in FIG. 7B, output of the (Z+1)-th reset signal RST_Z+1 is stopped in the period 214, so that a pulse of the (Z+1)-th reset signal RST_Z+1 is not output, and a pulse of the D-th reset signal RST_D is not output in the period 215. Note that a stop of output of a signal means, for example, a stop of a pulse of the signal or application of a voltage which does not function as a signal to a wiring for outputting a signal. A pulse generated due to noise or the like is not necessarily stopped.

Further, the selection signal output circuit 203 stops output of a pulse of the (W+1)-th selection signal SEL_W+1. For example, after the shift register outputs the X-th signal, output of either or both a clock signal or/and a power supply voltage to the shift register is stopped, whereby output of the pulse of the (W+1)-th selection signal SEL_W+1 is stopped. For example, as illustrated in FIG. 7B, output of the (Z+1)-th selection signal SEL_Z+1 is stopped in a period 216, so that the pulse of the (Z+1)-th selection signal SEL_Z+1 is not output, and a pulse of the B-th selection signal SEL_B is not output in a period 217.

The photodetector circuit 205p to which the selection signal SEL is not input does not output an optical data voltage.

Then, the reading circuit 206 sequentially reads optical data voltages output from part of the plurality of photodetector circuits 205p. When all the output optical data voltages are read, the reading operation is completed. The read optical data voltages are used as data signals for executing predetermined processing. That is the operation in the partly reading period.

Note that the entirely reading period and the partly reading period may be set appropriately. For example, a user can set the timing for performing entire reading or the timing for performing partial reading and can perform switching between driving in the entirely reading period and driving in the partly reading period arbitrarily.

As illustrated as an example in FIGS. 7A and 7B, in the input-output device of this embodiment, after the selection signal output circuit outputs the W-th selection signal, output of the (W+1)-th selection signal is stopped. Thus, power consumption can be reduced.

Further, a user of the input-output device of this embodiment can switch between the entirely reading operation and the partly reading operation as appropriate; therefore, power consumption can be reduced without disturbing an actual operation. For example, the partly reading operation is performed in the case where a user inputs data with the use of only part of the pixel portion (in the case where a keyboard is displayed in the pixel portion and data is input with the keyboard), and the entirely reading operation is performed in the case where a user inputs data with the use of the entire area of the pixel portion. Consequently, power consumption can be reduced.

Moreover, in the input-output device of this embodiment, not only output of the selection signal but output of the reset signal can be stopped, and after outputting the V-th reset signal, the reset signal output circuit stops output of the (V+1)-th reset signal. Thus, power consumption can be further reduced as compared to the case where only output of the selection signal is stopped.

Embodiment 6

In this embodiment, further described is the display circuit in the input-output device of the above embodiment.

Figure 8:
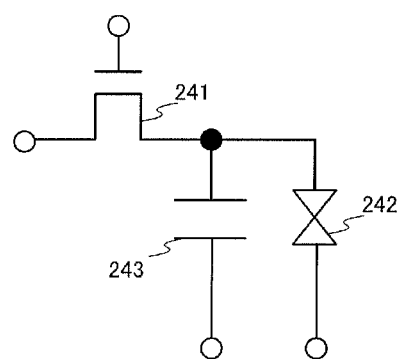
FIG. 8 illustrates an example of circuit configuration of a display circuit.

An example of the circuit configuration of the display circuit in the input-output device of the above embodiment is described with reference to FIG. 8. FIG. 8 is a circuit diagram for describing the circuit configuration of the display circuit.

The display circuit in FIG. 8 includes a transistor 241, a liquid crystal element 242, and a capacitor 243.

The transistor is a field-effect transistor having at least a source, a drain, and a gate unless otherwise specified.

The scan signal SCN is input to a gate of the transistor 241. The image signal IMG is input to one of a source and a drain of the transistor 241.

The off-state current of the transistor 241 is preferably low and for example, the off-state current per micrometer in channel width is preferably 10 aA ($1 \times 10^{-17}$ A) or less, more preferably 1 aA ($1 \times 10^{-18}$ A) or less, still more preferably 10 zA ($1 \times 10^{-20}$ A) or less, further preferably 1 zA ($1 \times 10^{-21}$ A) or less. The use of a transistor with low off-state current as the transistor 241 can suppress variation in voltage applied to the liquid crystal element 242 due to leakage current between the source and the drain of the transistor 241. As the transistor with low off-state current, a transistor including an oxide semiconductor layer as a channel formation layer can be used, for example. The oxide semiconductor layer of the transistor, which has a function of the channel formation layer, is a semiconductor layer highly purified to be intrinsic (also referred to as I-type) or substantially intrinsic.

The liquid crystal element 242 has a first terminal and a second terminal. The first terminal of the liquid crystal element 242 is electrically connected to the other of the source and the drain of the transistor 241. A constant voltage is selectively input to the second terminal of the liquid crystal element 242.

The liquid crystal element 242 may include a pixel electrode which functions as part or the whole of the first terminal, a common electrode which functions as part or the whole of the second terminal, and a liquid crystal layer whose light transmittance varies depending on a voltage applied between the pixel electrode and the common electrode.

Note that the pixel electrode may include a region transmitting visible light and a region reflecting visible light. The region transmitting visible light in the pixel electrode transmits light from a backlight, and the region reflecting visible light in the pixel electrode reflects light incident through the liquid crystal layer.

Examples of a liquid crystal that can be used for the liquid crystal layer are a nematic liquid crystal, a cholesteric liquid crystal, a smectic liquid crystal, a discotic liquid crystal, a thermotropic liquid crystal, a lyotropic liquid crystal, a low-molecular liquid crystal, a polymer dispersed liquid crystal (PDLC), a ferroelectric liquid crystal, an anti-ferroelectric liquid crystal, a main-chain liquid crystal, a side-chain high-molecular liquid crystal, a banana-shaped liquid crystal, and the like.

The resistivity of a liquid crystal material used for the liquid crystal layer is $1 \times 10^{12}$ Ω·cm or more, preferably $1 \times 10^{13}$ Ω·cm or more, more preferably $1 \times 10^{14}$ Ω·cm or more. Note that the resistivity in this specification is measured at 20° C. In the case where a liquid crystal element is formed using the liquid crystal material, the resistivity of the liquid crystal element may be $1\times10^{11}$ Ω·cm or more, furthermore $1\times10^{12}$ Ω·cm or more in some cases because of an impurity mixed into a liquid crystal layer from an alignment film, a sealant, or the like.

As the resistivity of the liquid crystal material is higher, the leakage current of the liquid crystal layer can be reduced and the decrease over time of the voltage applied to the liquid crystal element in the display period can be suppressed. As a result, the display period of the display circuit, in which one writing of the image data is reflected, can be extended, so that the frequency of writing the image data into the display circuit can be decreased, which leads to reduction in power consumption of the input-output device.

The following modes are examples of a method for driving the liquid crystal element: a TN (twisted nematic) mode, an STN (super twisted nematic) mode, an OCB (optically compensated birefringence) mode, an ECB (electrically controlled birefringence) mode, an FLC (ferroelectric liquid crystal) mode, an AFLC (anti-ferroelectric liquid crystal) mode, a PDLC (polymer dispersed liquid crystal) mode, a PNLC (polymer network liquid crystal) mode, a guest-host mode, and the like.

The capacitor 243 has a first terminal and a second terminal. The first terminal of the capacitor 243 is electrically connected to the other of the source and the drain of the transistor 241. A constant voltage is selectively input to the second terminal of the capacitor 243.

The capacitor 243 has a function of a storage capacitor, and can include a first electrode which functions as part of or the whole of the first terminal, a second electrode which functions as part of or the whole of the second terminal, and a dielectric layer. The capacitance of the capacitor 243 may be set in consideration of the off-state current of the transistor 241. In this embodiment, it is only necessary to provide a storage capacitor having capacitance which is ⅓ or less, preferably ⅕ or less of the capacitance of the liquid crystal element in each display circuit (also referred to as liquid crystal capacitance). The capacitor 243 is not necessarily provided. When the capacitor 243 is not provided in the display circuit, the aperture ratio of a pixel portion can be increased.

Next, described is an example of a method for driving the display circuit in FIG. 8.

First, the transistor 241 is turned on in accordance with a pulse of the scan signal SCN, a voltage of the first terminal of the liquid crystal element 242 is set to a value equivalent to a voltage of the image signal IMG, and a voltage depending on the image signal IMG is applied between the first terminal and the second terminal of the liquid crystal element 242. The liquid crystal element 242 has a light transmittance set in accordance with a voltage applied between the first terminal and the second terminal and is brought into a predetermined display state in accordance with the voltage. At that time, the display state of the display circuit is held for a certain period of time. The above operations are also performed on the other display circuits, whereby display states of all the display circuits are set. Accordingly, a voltage of the image signal IMG is written to each of the display circuits as a data signal. Thus, an image based on data of the image signal IMG is displayed in the pixel portion. That is the example of the method for driving the display circuit in FIG. 8.

As described with reference to FIG. 8, the display circuit of the input-output circuit in the above embodiment may include the transistor and the liquid crystal element. Since the liquid crystal element can transmit light depending on an applied voltage, when the display circuit and a photodetector circuit are provided in the pixel portion, a displaying operation and a reading operation can be performed.

Embodiment 7

In this embodiment, described is a transistor including an oxide semiconductor layer, which is applicable to the input circuit and the input-output device described in the above embodiment.

The transistor including an oxide semiconductor layer, which is applicable to the input circuit and the input-output device described in the above embodiment, is a transistor including a semiconductor layer highly purified to be intrinsic (also referred to as I-type) or substantially intrinsic.

As an oxide semiconductor used for the oxide semiconductor layer, a four-component metal oxide, a three-component metal oxide, or a two-component metal oxide can be used, for example. As the four-component metal oxide, an In—Sn—Ga—Zn—O-based metal oxide or the like can be used. As the three-component metal oxide, an In—Ga—Zn—O-based metal oxide, an In—Sn—Zn—O-based metal oxide, an In—Al—Zn—O-based metal oxide, a Sn—Ga—Zn—O-based metal oxide, an Al—Ga—Zn—O-based metal oxide, a Sn—Al—Zn—O-based metal oxide, or the like can be used. As the two-component metal oxide, an In—Zn—O-based metal oxide, a Sn—Zn—O-based metal oxide, an Al—Zn—O-based metal oxide, a Zn—Mg—O-based metal oxide, a Sn—Mg—O-based metal oxide, an In—Mg—O-based metal oxide, an In—Sn—O-based metal oxide, or the like can be used. Alternatively, as the oxide semiconductor, an In—O-based metal oxide, a Sn—O-based metal oxide, a Zn—O-based metal oxide, or the like may be used. The metal oxide that can be used as the oxide semiconductor may contain $SiO_2$.

As the oxide semiconductor, a material represented by $InMO_3(ZnO)_m$ (m is larger than 0) can be used. Here, M represents one or more metal elements selected from Ga, Al, Mn, and Co. For example, Ga, Ga and Al, Ga and Mn, Ga and Co, and the like can be given as M.

The band gap of the oxide semiconductor layer is 2 eV or more, preferably 2.5 eV or more, more preferably 3 eV or more. Thus, the number of carriers generated by thermal excitation is negligible. Further, the amount of impurity such as hydrogen which may serve as a donor is reduced to a certain amount or less so that the carrier concentration is less than $1\times10^{14}/cm^3$, preferably $1\times10^{12}/cm^3$ or less. That is, the carrier concentration of the oxide semiconductor layer is reduced to zero or substantially zero.

In the oxide semiconductor layer, the avalanche breakdown is not likely to occur and the withstand voltage is high. For example, the band gap of silicon is as narrow as 1.12 eV; therefore, electrons are likely to be generated owing to the avalanche breakdown, and electrons that are accelerated to be so rapid as to go over a barrier to the gate insulating layer are increased in number. In contrast, since the oxide semiconductor used for the aforementioned oxide semiconductor layer has a band gap of 2 eV or more which is wider than that of silicon, the avalanche breakdown is not likely to occur and resistance to hot-carrier degradation is higher than that of silicon, and the withstand voltage is thus high.

The hot-carrier degradation means, for example, deterioration of transistor characteristics caused by fixed charge which is generated when highly-accelerated electrons are injected into a gate insulating layer from a channel in the vicinity of a drain; or deterioration of transistor characteristics caused by a trap level which is formed at the interface of a gate insulating layer by highly-accelerated electrons. The deterioration of transistor characteristics is, for example, gate leakage or the variation in threshold voltage. The factors of the hot-carrier degradation are channel-hot-electron injection (also referred to as CHE injection) and drain-avalanche-hot-carrier injection (also referred to as DAHC injection).

Note that the band gap of silicon carbide, which is one of materials having high withstand voltage, is substantially equal to that of an oxide semiconductor used for the oxide semiconductor layer, but electrons are less likely to be accelerated in an oxide semiconductor because the mobility of the oxide semiconductor is lower than that of silicon carbide by approximately two orders of magnitude. Further, since a barrier between an oxide semiconductor and a gate insulating layer is larger than a barrier between silicon carbide, gallium nitride, or silicon and a gate insulating layer, the number of electrons injected into the gate insulating layer is extremely small, whereby hot-carrier degradation is less likely to be caused and withstand voltage is high as compared to the case of silicon carbide, gallium nitride, or silicon. The oxide semiconductor has a high withstand voltage even in an amorphous state.

In a transistor including the oxide semiconductor layer, the off-state current per micrometer in channel width can be 10 aA ($1 \times 10^{-17}$ A) or less, preferably 1 aA ($1 \times 10^{-18}$ A) or less, more preferably 10 zA ($1 \times 10^{-20}$ A) or less, still more preferably 1 zA ($1 \times 10^{-21}$ A) or less.

In the transistor including the oxide semiconductor layer, degradation due to light (e.g., the variation in threshold voltage) is less likely to be caused.

Structural examples of the transistor including an oxide semiconductor layer, which is applicable to the input circuit and the input-output device described in the above embodiment, are described with reference to FIGS. 9A to 9D. FIGS. 9A to 9D are cross-sectional schematic views illustrating the structural examples of the transistor.

Figure 9A:
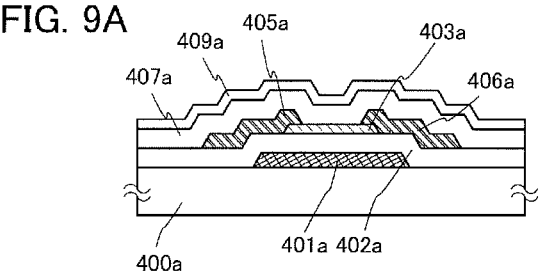
FIGS. 9A to 9D are cross-sectional schematic views each illustrating a structural example of a transistor.

The transistor illustrated in FIG. 9A is one of bottom-gate transistors and is also an inverted staggered transistor.

The transistor illustrated in FIG. 9A includes a conductive layer 401a serving as a gate electrode, an insulating layer 402a serving as a gate insulating layer, an oxide semiconductor layer 403a serving as a channel formation layer, and a conductive layer 405a and a conductive layer 406a serving as source and drain electrodes.

The conductive layer 401a is provided over a substrate 400a, the insulating layer 402a is provided over the conductive layer 401a, the oxide semiconductor layer 403a is provided over the conductive layer 401a with the insulating layer 402a therebetween, and the conductive layer 405a and the conductive layer 406a are each provided over part of the oxide semiconductor layer 403a.

In the transistor illustrated in FIG. 9A, an oxide insulating layer 407a is provided in contact with part of a top surface of the oxide semiconductor layer 403a (part of the top surface over which the conductive layer 405a or the conductive layer 406a is not provided). In addition, a protective insulating layer 409a is provided over the oxide insulating layer 407a.

Figure 9B:
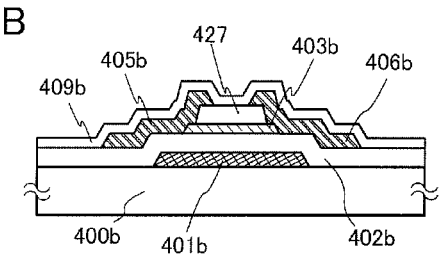

The transistor illustrated in FIG. 9B is one of bottom-gate transistors called a channel-protective (channel-stop) transistor and is also an inverted staggered transistor.

The transistor illustrated in FIG. 9B includes a conductive layer 401b serving as a gate electrode, an insulating layer 402b serving as a gate insulating layer, an oxide semiconductor layer 403b serving as a channel formation layer, an insulating layer 427 serving as a channel protective layer, and a conductive layer 405b and a conductive layer 406b serving as source and drain electrodes.

The conductive layer 401b is provided over a substrate 400b, the insulating layer 402b is provided over the conductive layer 401b, the oxide semiconductor layer 403b is provided over the conductive layer 401b with the insulating layer 402b therebetween, the insulating layer 427 is provided over the conductive layer 401b with the insulating layer 402b and the oxide semiconductor layer 403b therebetween, and the conductive layer 405b and the conductive layer 406b are provided over part of the oxide semiconductor layer 403b with the insulating layer 427 therebetween. The conductive layer 401b may overlap with the whole oxide semiconductor layer 403b. When the conductive layer 401b overlaps with the whole oxide semiconductor layer 403b, incidence of light on the oxide semiconductor layer 403b can be suppressed. It is not always necessary to employ that structure, and the conductive layer 401b may overlap with part of the oxide semiconductor layer 403b.

Further, a protective insulating layer 409b is in contact with an upper portion of the transistor in FIG. 9B.

Figure 9C:
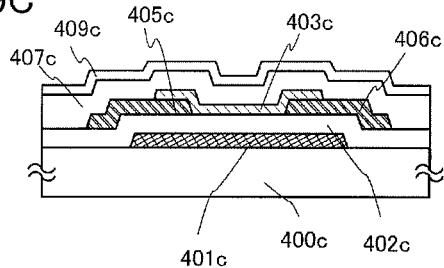

The transistor illustrated in FIG. 9C is one of bottom-gate transistors.

The transistor illustrated in FIG. 9C includes a conductive layer 401c serving as a gate electrode, an insulating layer 402c serving as a gate insulating layer, an oxide semiconductor layer 403c serving as a channel formation layer, and a conductive layer 405c and a conductive layer 406c serving as source and drain electrodes.

The conductive layer 401c is provided over a substrate 400c, the insulating layer 402c is provided over the conductive layer 401c, the conductive layer 405c and the conductive layer 406c are provided over part of the insulating layer 402c, and the oxide semiconductor layer 403c is provided over the conductive layer 401c with the insulating layer 402c, the conductive layer 405c, and the conductive layer 406c therebetween. The conductive layer 401c may overlap with the whole oxide semiconductor layer 403c. When the conductive layer 401c overlaps with the whole oxide semiconductor layer 403c, incidence of light on the oxide semiconductor layer 403c can be suppressed. It is not always necessary to employ that structure, and the conductive layer 401c may overlap with part of the oxide semiconductor layer 403c.

Further, in the transistor illustrated in FIG. 9C, an oxide insulating layer 407c is in contact with a top surface and a side surface of the oxide semiconductor layer 403c. In addition, a protective insulating layer 409c is provided over the oxide insulating layer 407c.

Figure 9D:
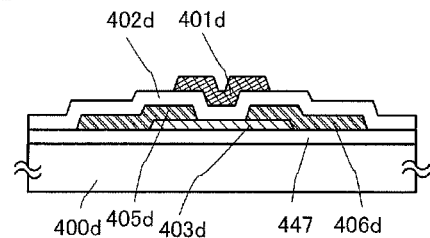

The transistor illustrated in FIG. 9D is one of top-gate transistors.

The transistor illustrated in FIG. 9D includes a conductive layer 401d serving as a gate electrode, an insulating layer 402d serving as a gate insulating layer, an oxide semiconductor layer 403d serving as a channel formation layer, and a conductive layer 405d and a conductive layer 406d serving as source and drain electrodes.

The oxide semiconductor layer 403d is provided over a substrate 400d with an insulating layer 447 therebetween, the conductive layer 405d and the conductive layer 406d are each provided over part of the oxide semiconductor layer 403d, the insulating layer 402d is provided over the oxide semiconductor layer 403d, the conductive layer 405d, and the conductive layer 406d, and the conductive layer 401d is provided over the oxide semiconductor layer 403d with the insulating layer 402d therebetween.

Moreover, components of the transistors illustrated in FIGS. 9A to 9D are described below.

As the substrates 400a to 400d, a glass substrate of barium borosilicate glass, aluminoborosilicate glass, or the like can be used, for example.

Alternatively, a substrate formed of an insulator, such as a ceramic substrate, a quartz substrate, or a sapphire substrate, may be used as the substrates 400a to 400d. Still alternatively, a crystallized glass substrate, a plastic substrate, or a semiconductor substrate of silicon or the like may be used as the substrates 400a to 400d.

The insulating layer 447 serves as a base layer preventing diffusion of an impurity element from the substrate 400d. As the insulating layer 447, a silicon nitride layer, a silicon oxide layer, a silicon nitride oxide layer, a silicon oxynitride layer, an aluminum oxide layer, or an aluminum oxynitride layer can be used, for example. The insulating layer 447 may be formed by stacking layers of materials which can be applied to the insulating layer 447. Alternatively, the insulating layer 447 can be a stack of a layer including a light-blocking material and a layer including any of the above materials applicable to the insulating layer 447. When the insulating layer 447 is formed using a layer including a light-blocking material, light can be prevented from entering the oxide semiconductor layer 403d.

Note that in the transistors illustrated in FIGS. 9A to 9C, an insulating layer may be provided between the substrate and the conductive layer serving as a gate electrode, as in the transistor illustrated in FIG. 9D.

As the conductive layers 401a to 401d, a layer of a metal material such as molybdenum, titanium, chromium, tantalum, tungsten, aluminum, copper, neodymium, or scandium or an alloy material containing any of these materials as a main component can be used, for example. The conductive layers 401a to 401d may be formed by stacking layers of materials which can be applied to the conductive layers 401a to 401d.

As the insulating layers 402a to 402d, a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, or a hafnium oxide layer can be used, for example. The insulating layers 402a to 402d may be formed by stacking layers of materials which can be applied to the insulating layers 402a to 402d. The layers of materials which can be applied to the insulating layers 402a to 402d can be formed by a plasma CVD method, a sputtering method, or the like. For example, the insulating layers 402a to 402d can be formed in such a manner that a silicon nitride layer is formed by a plasma CVD method and a silicon oxide layer is formed over the silicon nitride layer by a plasma CVD method.

As an oxide semiconductor which can be used in the oxide semiconductor layers 403a to 403d, a four-component metal oxide, a three-component metal oxide, and a two-component metal oxide can be given, for example. As the four-component metal oxide, an In—Sn—Ga—Zn—O-based metal oxide and the like can be given. As the three-component metal oxide, an In—Ga—Zn—O-based metal oxide, an In—Sn—Zn—O-based metal oxide, an In—Al—Zn—O-based metal oxide, a Sn—Ga—Zn—O-based metal oxide, an Al—Ga—Zn—O-based metal oxide, a Sn—Al—Zn—O-based metal oxide, and the like can be given. As the two-component metal oxide, an In—Zn—O-based metal oxide, a Sn—Zn—O-based metal oxide, an Al—Zn—O-based metal oxide, a Zn—Mg—O-based metal oxide, a Sn—Mg—O-based metal oxide, an In—Mg—O-based metal oxide, an In—Sn—O-based metal oxide, and the like can be given. Alternatively, as the oxide semiconductor, an In—O-based metal oxide, a Sn—O-based metal oxide, a Zn—O-based metal oxide, or the like may be used. The metal oxide that can be used as the oxide semiconductor may contain $SiO_2$. Here, for example, the In—Ga—Zn—O-based metal oxide means an oxide containing at least In, Ga, and Zn, and the composition ratio of the elements is not particularly limited. The In—Ga—Zn—O-based metal oxide may contain an element other than the In, Ga, and Zn.

Further, as an oxide semiconductor which can be used in the oxide semiconductor layers 403a to 403d, a metal oxide represented by $InMO_3(ZnO)_m$ (m is larger than 0) can be given. Here, M represents one or more metal elements selected from Ga, At, Mn, and Co. For example, Ga, Ga and Al, Ga and Mn, Ga and Co, and the like can be given as M.

As the conductive layers 405a to 405d and the conductive layers 406a to 406d, a layer of a metal material such as aluminum, chromium, copper, tantalum, titanium, molybdenum, or tungsten or an alloy material containing any of the metal materials as a main component may be used, for example. The conductive layers 405a to 405d and the conductive layers 406a to 406d may be formed by stacking layers of materials which can be applied to the conductive layers 405a to 405d and the conductive layers 406a to 406d.

For example, the conductive layers 405a to 405d and the conductive layers 406a to 406d may be formed by stacking a metal layer of aluminum or copper and a high-melting-point metal layer of titanium, molybdenum, tungsten, or the like. The conductive layers 405a to 405d and the conductive layers 406a to 406d may have a structure in which a metal layer of aluminum or copper is provided between a plurality of high-melting-point metal layers. Further, when the conductive layers 405a to 405d and the conductive layers 406a to 406d are formed using an aluminum layer to which an element that prevents generation of hillocks or whiskers (e.g., Si, Nd, or Sc) is added, heat resistance can be increased.

Alternatively, the conductive layers 405a to 405d and the conductive layers 406a to 406d may be formed using a layer containing a conductive metal oxide. As the conductive metal oxide, indium oxide ($In_2O_3$), tin oxide ($SnO_2$), zinc oxide (ZnO), an alloy of indium oxide and tin oxide ($In_2O_3$—$SnO_2$, abbreviated as ITO), an alloy of indium oxide and zinc oxide ($In_2O_3$—ZnO), or such a metal oxide material containing silicon oxide may be used, for example.

Furthermore, another wiring may be formed using the material used to form the conductive layers 405a to 405d and the conductive layers 406a to 406d.

As the insulating layer 427, a layer which can be applied to the base layer 447 can be used, for example. The insulating layer 427 may be formed by stacking layers of materials which can be applied to the insulating layer 427.

As the oxide insulating layer 407a and the oxide insulating layer 407c, an oxide insulating layer may be used and, for example, a silicon oxide layer or the like may be used. The oxide insulating layer 407a and the oxide insulating layer 407c may be formed by stacking layers of materials which can be applied to the oxide insulating layer 407a and the oxide insulating layer 407c.

As the protective insulating layers 409a to 409c, an inorganic insulating layer may be used and, for example, a silicon nitride layer, an aluminum nitride layer, a silicon nitride oxide layer, an aluminum nitride oxide layer, or the like may be used. The protective insulating layers 409a to 409c may be formed by stacking layers of materials which can be applied to the protective insulating layers 409a to 409c.

In order to reduce surface unevenness due to the transistor of this embodiment, a planarization insulating layer may be provided over the transistor (in the case where the transistor includes an oxide insulating layer or a protective insulating layer, over the transistor with the oxide insulating layer or the protective insulating layer therebetween). As the planarization insulating layer, a layer of an organic material such as polyimide, acrylic, or benzocyclobutene may be used. Alternatively, a layer of a low-dielectric constant material (also referred to as a low-k material) may be used as the planarization insulating layer. The planarization insulating layer may be formed by stacking layers of materials which can be applied to the planarization insulating layer.

An example of the fabrication method of the transistor in FIG. 9A is described with reference to FIGS. 10A to 10C and FIGS. 11A and 11B as an example of the fabrication method of the transistor including an oxide semiconductor layer, which is applicable to the input circuit or the input-output circuit in the above embodiment. FIGS. 10A to 10C and FIGS. 11A and 11B are cross-sectional schematic views illustrating the example of the fabrication method of the transistor in FIG. 9A.

First, the substrate 400a is prepared, and a first conductive film is formed over the substrate 400a.

A glass substrate is used as the substrate 400a, for example.

As the first conductive film, a film of a metal material such as molybdenum, titanium, chromium, tantalum, tungsten, aluminum, copper, neodymium, or scandium, or an alloy material which contains any of the metal materials as a main component may be used. The first conductive film may be formed by stacking layers of materials which can be applied to the first conductive film.

Next, a first photolithography process is carried out: a first resist mask is formed over the first conductive film, the first conductive film is selectively etched with the use of the first resist mask to form the conductive layer 401a, and the first resist mask is removed.

In this embodiment, the resist mask may be formed by an ink-jet method. Formation of the resist mask by an inkjet method needs no photomask; thus, manufacturing cost can be reduced.

In order to reduce the number of photomasks and steps in the photolithography process, the etching may be performed using a resist mask formed with the use of a multi-tone mask. A multi-tone mask is a mask through which light is transmitted to have a plurality of intensities. A resist mask formed with the use of a multi-tone mask has a plurality of thicknesses and further can be changed in shape by etching; therefore, the resist mask can be used in a plurality of etching steps for processing into different patterns. Therefore, a resist mask corresponding to at least two or more kinds of different patterns can be formed with one multi-tone mask. Thus, the number of light-exposure masks can be reduced and the number of corresponding photolithography processes can be also reduced, whereby a manufacturing process can be simplified.

Next, the insulating layer 402a is formed over the conductive layer 401a.

For example, the insulating layer 402a may be formed by a high-density plasma CVD method. For example, a high-density plasma CVD method using microwaves (e.g., microwaves with a frequency of 2.45 GHz) is preferable because a high-quality insulating layer which is dense and has a high withstand voltage can be formed. When the oxide semiconductor layer is in contact with the high-quality insulating layer formed by a high-density plasma CVD method, the interface states can be reduced and interface characteristics can be favorable.

Any other method such as a sputtering method or a plasma CVD method may be employed to form the insulating layer 402a. Further, heat treatment may be performed after formation of the insulating layer 402a. The heat treatment can improve film quality of the insulating layer 402a and the interface characteristics between the insulating layer 402a and the oxide semiconductor.

Next, an oxide semiconductor film 530 having a thickness of 2 nm to 200 nm inclusive, preferably 5 nm to 30 nm inclusive is formed over the insulating layer 402a. For example, the oxide semiconductor film 530 may be formed by a sputtering method.

Note that before the oxide semiconductor film 530 is formed, powder substances (also referred to as particles or dust) attached on a surface of the insulating layer 402a are preferably removed by reverse sputtering in which an argon gas is introduced and plasma is generated. The reverse sputtering refers to a method in which, without application of a voltage to a target side, an RF power source is used for application of a voltage to a substrate side in an argon atmosphere to generate plasma in the vicinity of the substrate to modify a surface. Note that instead of an argon atmosphere, a nitrogen atmosphere, a helium atmosphere, an oxygen atmosphere, or the like may be used.

Figure 10A:
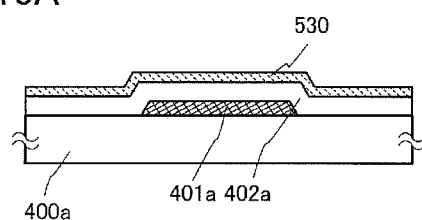
FIGS. 10A to 10C are cross-sectional schematic views illustrating a method for manufacturing the transistor in FIG. 9A.
Figure 10B:
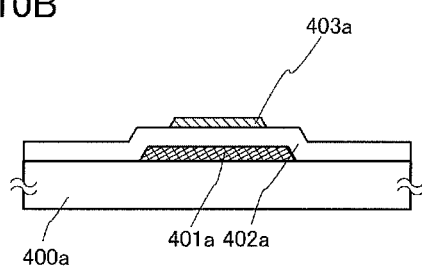

For example, the oxide semiconductor film 530 may be formed using an oxide semiconductor material which can be applied to the oxide semiconductor layer 403a. In this embodiment, the oxide semiconductor film 530 is formed by a sputtering method with the use of an In—Ga—Zn—O-based oxide target, for example. FIG. 10A is a cross-sectional schematic view of this stage. The oxide semiconductor film 530 may be formed by a sputtering method in a rare gas (typically, argon) atmosphere, an oxygen atmosphere, or a mixed atmosphere of a rare gas and oxygen.

As a target for forming the oxide semiconductor film 530 by a sputtering method, for example, an oxide target having the following composition ratio can be used: the composition ratio of $In_2O_3:Ga_2O_3:ZnO$ is 1:1:1 [molar ratio]. Without limitation to the above target, for example, an oxide target having the following composition ratio may be used: the composition ratio of $In_2O_3:Ga_2O_3:ZnO$ is 1:1:2 [molar ratio]. The proportion of the volume of a portion except for an area occupied by a space and the like with respect to the total volume of the oxide target formed (also referred to as the fill rate) is 90% to 100% inclusive, preferably, 95% to 99.9% inclusive. With the use of a metal oxide target with high fill rate, a dense oxide semiconductor film is formed.

It is preferable that a high-purity gas in which impurities such as hydrogen, water, a hydroxyl group, and hydride are removed be used for example, as the sputtering gas for the formation of the oxide semiconductor film 530.

Before formation of the oxide semiconductor film 530, it is preferable that the substrate 400a over which the conductive layer 401a is formed or the substrate 400a over which the conductive layer 401a and the insulating layer 402a are formed be heated in a preheating chamber of the sputtering apparatus so that impurities such as hydrogen and moisture adsorbed onto the substrate 400a are eliminated. The preheat treatment in the preheating chamber can prevent hydrogen, a hydroxyl group, and moisture from entering the insulating layer 402a and the oxide semiconductor film 530. Note that a cryopump is preferable as an evacuation unit provided in the preheating chamber. The preheat treatment may be omitted. The preheat treatment in the preheating chamber may be similarly performed on the substrate 400a over which layers up to and including the conductive layer 405a and the conductive layer 406a are formed before formation of the oxide insulating layer 407a.

When the oxide semiconductor film 530 is formed by a sputtering method, the substrate 400a is placed in a deposition chamber kept under reduced pressure, and the temperature of the substrate 400a is set to 100° C. to 600° C. inclusive, preferably 200° C. to 400° C. inclusive. By heating the substrate 400a, the concentration of an impurity contained in the oxide semiconductor film 530 can be reduced. Moreover, damage of the oxide semiconductor film 530 due to sputtering is reduced. Then, a sputtering gas from which hydrogen and moisture are removed is introduced into the deposition chamber from which remaining moisture is being removed, and the oxide semiconductor film 530 is formed over the insulating layer 402a with the use of the target.

Note that in this embodiment, for example, an entrapment vacuum pump may be used as a means for removing moisture remaining in the deposition chamber in which sputtering is performed. As the entrapment vacuum pump, a cryopump, an ion pump, or a titanium sublimation pump is preferably used, for example. When a cryopump is used as an example, a compound including either or both a hydrogen atom or/and a carbon atom, or the like can be eliminated, and thus the concentration of an impurity included in a film formed in the deposition chamber can be reduced. Further, in this embodiment, a turbo pump provided with a cold trap may be used as a means for removing moisture remaining in the deposition chamber in which sputtering is performed.

An example of the deposition condition is as follows: the distance between the substrate and the target is 100 mm, the pressure is 0.6 Pa, the direct-current (DC) power is 0.5 kW, and the atmosphere is an oxygen atmosphere (the flow rate of the oxygen is 100%). Note that when a pulse direct current power source is used, powder substances generated in deposition can be reduced and the film thickness can be uniform.

Next, a second photolithography process is carried out: a second resist mask is formed over the oxide semiconductor film 530, the oxide semiconductor film 530 is selectively etched with the use of the second resist mask to process the oxide semiconductor film 530 into an island-shaped oxide semiconductor layer, and the second resist mask is removed.

In the case of forming a contact hole in the insulating layer 402a, the contact hole may be formed at the time of processing the oxide semiconductor film 530 into the island-shaped oxide semiconductor layer.

For example, dry etching, wet etching, or both dry etching and wet etching may be employed for etching the oxide semiconductor film 530. As an etchant used for wet etching, for example, a mixed solution of phosphoric acid, acetic acid, and nitric acid can be used. In addition, ITO07N (produced by Kanto Chemical Co., Inc.) may be used.

Next, heat treatment is performed on the oxide semiconductor layer. The oxide semiconductor layer can be dehydrated or dehydrogenated through the heat treatment. The temperature of the heat treatment is 400° C. to 750° C. inclusive or higher than or equal to 400° C. and lower than the strain point of the substrate. Here, the substrate is put in an electric furnace which is a kind of heat treatment apparatus and heat treatment is performed on the oxide semiconductor layer at 450° C. for one hour in a nitrogen atmosphere, and then, the oxide semiconductor layer is not exposed to the air so that entry of water and hydrogen into the oxide semiconductor layer is prevented; thus, an oxide semiconductor layer 403a is obtained (see FIG. 10B).

Note that a heat treatment apparatus is not limited to an electric furnace, and may include a device for heating an object to be processed by heat conduction or heat radiation from a heating element such as a resistance heating element. For example, a rapid thermal anneal (RTA) apparatus such as a gas rapid thermal anneal (GRTA) apparatus or a lamp rapid thermal anneal (LRTA) apparatus may be used. An LRTA apparatus is an apparatus for heating an object to be processed by radiation of light (electromagnetic waves) emitted from a lamp such as a halogen lamp, a metal halide lamp, a xenon arc lamp, a carbon arc lamp, a high pressure sodium lamp, or a high pressure mercury lamp. A GRTA apparatus is an apparatus for heat treatment using a high temperature gas. As the high temperature gas, an inert gas which does not react with an object to be processed in heat treatment, such as nitrogen or a rare gas like argon, is used.

For example, as the heat treatment, GRTA in which the substrate is moved into an inert gas heated to a high temperature as high as 650° C. to 700° C., heated for several minutes, and moved out of the heated inert gas may be performed.

Note that in the heat treatment in the heat treatment apparatus, it is preferable that water, hydrogen, and the like be not contained in the atmosphere of nitrogen or a rare gas such as helium, neon, or argon. It is preferable that the purity of nitrogen or the rare gas such as helium, neon, or argon which is introduced into the heat treatment apparatus be set to 6N (99.9999%) or higher, preferably 7N (99.99999%) or higher. That is, it is preferable to set the impurity concentration to 1 ppm or lower, preferably 0.1 ppm or lower.

Further, after the oxide semiconductor layer is heated through the heat treatment in the heat treatment apparatus, a high-purity oxygen gas, a high-purity $N_2O$ gas, or ultra-dry air (having a dew point −40° C. or lower, preferably −60° C. or lower) may be introduced in the furnace where the heat treatment has been performed. It is preferable that water, hydrogen, and the like be not contained in an oxygen gas or an NO gas. The purity of the oxygen gas or the $N_2O$ gas which is introduced into the heat treatment apparatus is preferably 6N or higher, more preferably 7N or higher. That is, it is preferable to set the concentration of impurities in the oxygen gas or the $N_2O$ gas to 1 ppm or lower, more preferably 0.1 ppm or lower. By the action of the oxygen gas or the $N_2O$ gas, oxygen which has been reduced at the same time as the step of removing impurities by dehydration or dehydrogenation is supplied, so that the oxide semiconductor layer 403a can be highly purified.

The heat treatment in the heat treatment apparatus may be performed on the oxide semiconductor film 530 which has not yet been processed into the island-shaped oxide semiconductor layer. In that case, the substrate 400a is taken out of the heat treatment apparatus after the heat treatment in the heat treatment apparatus, and then the oxide semiconductor film 530 is processing into the island-shaped oxide semiconductor layer.

Note that the heat treatment in the heat treatment apparatus may be performed at any of the following timings instead of the above timing as long as it is after formation of the oxide semiconductor layer: after the conductive layer 405a and the conductive layer 406a are formed over the oxide semiconductor layer 403a; and after the oxide insulating layer 407a is formed over the conductive layer 405a and the conductive layer 406a.

In the case of forming a contact hole in the insulating layer 402a, the contact hole may be formed before the heat treatment in the heat treatment apparatus is performed on the oxide semiconductor film 530.

Further, the oxide semiconductor layer may be formed using an oxide semiconductor film formed to have a crystal region (single crystal region) with a large thickness, namely, a crystal region whose c-axes are aligned perpendicularly to a surface of the film, regardless of a material of a base component used, such as oxide, nitride, or metal, by performing deposition twice and performing heat treatment twice. For example, a first oxide semiconductor film with a thickness of 3 nm to 15 nm inclusive is formed, and heat treatment is performed in nitrogen, oxygen, a rare gas, or a dry air atmosphere at a temperature of 450° C. to 850° C. inclusive, preferably 550° C. to 750° C. inclusive, so that a first oxide semiconductor film having a crystal region (including a plate-like crystal) in a region including a surface is formed. Then, a second oxide semiconductor film which has a larger thickness than the first oxide semiconductor film is formed, and heat treatment is performed at a temperature of 450° C. to 850° C. inclusive, preferably 600° C. to 700° C. inclusive, so that crystal growth proceeds upward from the first oxide semiconductor film to the second oxide semiconductor film with the use of the first oxide semiconductor film as a seed of the crystal growth and thus the whole second oxide semiconductor film is crystallized. In such a manner, the oxide semiconductor layer 403a may be formed using the oxide semiconductor film having a crystal region with a large thickness.

Next, a second conductive film is formed over the insulating layer 402a and the oxide semiconductor layer 403a.

As the second conductive film, a film of a metal material such as aluminum, chromium, copper, tantalum, titanium, molybdenum, or tungsten, or an alloy material which contains any of the metal materials as a main component may be used, for example. The second conductive film may be formed by stacking films of materials which can be applied to the second conductive film.

Figure 10C:
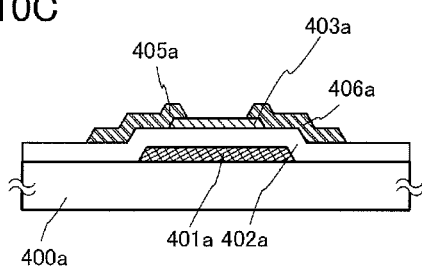

Next, a third photolithography process is carried out: a third resist mask is formed over the second conductive film, the second conductive film is selectively etched with the use of the third resist mask to form the conductive layer 405a and the conductive layer 406a, and the third resist mask is removed (see FIG. 10C).

Furthermore, another wiring may be formed using the second conductive film at the time of forming the conductive layer 405a and the conductive layer 406a.

When light exposure is performed in the formation of the third resist mask, ultraviolet light, a KrF laser beam, or an ArF laser beam is preferably used. The channel length L of a transistor that is completed later is determined by a distance between bottom edges of the conductive layer 405a and the conductive layer 406a, which are adjacent to each other over the oxide semiconductor layer 403a. In the formation of the third resist mask, in the case where light exposure is performed for a channel length L of less than 25 nm, the light exposure may be performed using extreme ultraviolet light having an extremely short wavelength of several nanometers to several tens of nanometers. Light exposure with extreme ultraviolet light leads to a high resolution and a large depth of focus. Thus, the channel length L of the transistor that is completed later can be 10 nm to 1000 nm inclusive and the use of such a transistor formed through the light exposure enables higher speed operation of a circuit. Moreover, the off-state current of the transistor is significantly low; thus, power consumption can be reduced.

In the case of etching the second conductive film, etching conditions are preferably optimized in order to prevent the oxide semiconductor layer 403a from being divided by the etching. However, it is difficult to set conditions under which only the second conductive film can be etched and the oxide semiconductor layer 403a is not etched. In some cases, only part of the oxide semiconductor layer 403a is etched to be the oxide semiconductor layer 403a having a groove portion (a recessed portion) when the second conductive film is etched.

In this embodiment, since a titanium film is used as the second conductive film and an In—Ga—Zn—O-based oxide semiconductor is used as the oxide semiconductor layer 403a, an ammonium hydroxide-hydrogen peroxide mixture (a mixture of ammonia, water, and a hydrogen peroxide solution) is used as an etchant.

Next, the oxide insulating layer 407a is formed over the oxide semiconductor layer 403a, the conductive layer 405a, and the conductive layer 406a. At that time, the oxide insulating layer 407a is in contact with part of the top surface of the oxide semiconductor layer 403a.

The oxide insulating layer 407a may be formed to a thickness of at least 1 nm using a method by which impurities such as water and hydrogen do not enter the oxide insulating layer 407a, such as a sputtering method, as appropriate. When hydrogen is contained in the insulating layer 407a, entry of the hydrogen into the oxide semiconductor layer, or extraction of oxygen in the oxide semiconductor layer by the hydrogen may occur, thereby causing the backchannel of the oxide semiconductor layer to have lower resistance (to be n-type), so that a parasitic channel may be formed. Therefore, it is important that a method in which hydrogen is not used is employed in order to form the insulating layer 407a containing as little hydrogen as possible.

In this embodiment, a silicon oxide film is formed to a thickness of 200 nm as the oxide insulating layer 407a by a sputtering method. The substrate temperature in deposition may be higher than or equal to room temperature and lower than or equal to 300° C. and is 100° C. in this embodiment. The silicon oxide film can be formed by a sputtering method in a rare gas (typically, argon) atmosphere, an oxygen atmosphere, or a mixed atmosphere containing a rare gas and oxygen.

As a target, a silicon oxide target or a silicon target may be used. Further, a silicon oxide target, a silicon target, or the like may be used as a target for forming the oxide insulating layer 407a. For example, the silicon oxide film may be formed using a silicon target by a sputtering method in an atmosphere containing oxygen.

It is preferable that a high-purity gas in which impurities such as hydrogen, water, a hydroxyl group, and hydride are removed be used as the sputtering gas for the formation of the oxide insulating layer 407a.

Before formation of the oxide insulating layer 407a, plasma treatment with the use of a gas such as $N_2O$, $N_2$, or Ar may be performed to remove water or the like adsorbed onto an exposed surface of the oxide semiconductor layer 403a. In the case where the plasma treatment is performed, the oxide insulating layer 407a is preferably formed without exposure to the air in contact with part of the top surface of the oxide semiconductor layer 403a.

Further, second heat treatment may be performed in an inert gas atmosphere or an oxygen gas atmosphere (preferably at a temperature of 200° C. to 400° C. inclusive, for example, 250° C. to 350° C. inclusive). For example, the second heat treatment is performed in a nitrogen atmosphere at 250° C. for one hour. The second heat treatment is performed while part of the top surface of the oxide semiconductor layer 403a is in contact with the oxide insulating layer 407a.

Through the above steps, impurities such as hydrogen, moisture, a hydroxyl group, and hydride (also referred to as a hydrogen compound) are intentionally removed from the oxide semiconductor layer. Additionally, oxygen can be supplied. Accordingly, the oxide semiconductor layer is highly purified.

Figure 11A:
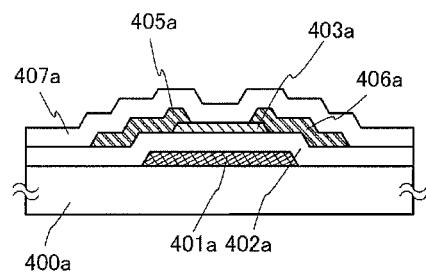
FIGS. 11A and 11B are cross-sectional schematic views illustrating a method for manufacturing the transistor in FIG. 9A.
Figure 11B:
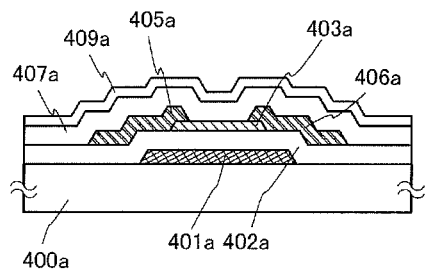

Through the above steps, the transistor is formed (see FIG. 11A).

When a silicon oxide layer having a lot of defects is used as the oxide insulating layer 407a, heat treatment performed after formation of the silicon oxide layer has an effect in diffusing an impurity such as hydrogen, moisture, a hydroxyl group, or hydride contained in the oxide semiconductor layer 403a to the oxide insulating layer 407a so that the impurity contained in the oxide semiconductor layer 403a can be further reduced.

A protective insulating layer 409a may be formed over the oxide insulating layer 407a. For example, a silicon nitride film is formed by an RF sputtering method. Since high productivity can be achieved with an RF sputtering method, an RF sputtering method is preferably employed as a formation method of the protective insulating layer 409a. In this embodiment, a silicon nitride film is formed as the protective insulating layer 409a (see FIG. 1B).

In this embodiment, as the protective insulating layer 409a, a silicon nitride film is formed with the use of a target of a silicon semiconductor by heating the substrate 400a over which layers up to and including the oxide insulating layer 407a are formed, to a temperature of 100° C. to 400° C., introducing a sputtering gas containing high-purity nitrogen in which hydrogen and moisture are removed. In that case, the protective insulating layer 409a is preferably formed while moisture remaining in the treatment chamber is removed, similarly to the oxide insulating layer 407a.

After the formation of the protective insulating layer 409a, heat treatment may be further performed at a temperature of 100° C. to 200° C. inclusive in the air for an hour to 30 hours inclusive. This heat treatment may be performed at a fixed heating temperature. Alternatively, the following change in the heating temperature may be conducted plural times repeatedly: the heating temperature is increased from a room temperature to a temperature of 100° C. to 200° C. inclusive and then decreased to a room temperature. That is an example of a method for manufacturing the transistor in FIG. 9A.

Although the example of the fabrication method of the transistor in FIG. 9A is described, the present invention is not limited to this example. For example, as for the components of FIGS. 9B to 9D which have the same designations as the components of FIG. 9A and whose function is at least partly the same as that of the components of FIG. 9A, description of the example of the fabrication method of the transistor in FIG. 9A can be referred to as appropriate.

As described above, the transistor including an oxide semiconductor layer, which is applicable to the input circuit or the input-output circuit in the above embodiment, is a transistor including an oxide semiconductor layer as a channel formation layer. The oxide semiconductor layer used in the transistor is highly purified by heat treatment to be i-type or substantially i-type.

The highly purified oxide semiconductor layer includes extremely few carriers (close to 0). The carrier concentration of the oxide semiconductor layer is less than $1\times10^{14}/cm^3$, preferably less than $1\times10^{12}/cm^3$, still preferably less than $1\times10^{11}/cm^3$. Therefore, the off-state current per micrometer in channel width can be 10 aA ($1\times10^{-17}$ A) or less, preferably 1 aA ($1\times10^{-18}$ A) or less, more preferably 10 zA ($1\times10^{-20}$ A) or less, still more preferably 1 zA ($1\times10^{-21}$ A) or less.

For example, when the transistor is used in the display circuit in the input-output device of the above embodiment, a period in which an image based on image data at the time of displaying a still image is held can be made longer, so that power consumption of the input-output device can be reduced.

Further, for example, by using the transistor, a selection signal output circuit, a reset signal output circuit, and a photodetector circuit can be formed in the same process; thus, manufacturing cost of the input-output device can be reduced.

Furthermore, for example, by using the transistor, a scan signal output circuit, an image signal output circuit, a selection signal output circuit, a reset signal output circuit, a display circuit, and a photodetector circuit can be formed in the same process; thus, manufacturing cost of the input-output device can be reduced.

Embodiment 8

In this embodiment, described are electronic devices each provided with the input-output device of the above embodiment.

Structural examples of the electronic devices in this embodiment are described with reference to FIGS. 12A to 12F. FIGS. 12A to 12F illustrate the structural examples of the electronic devices of this embodiment.

Figure 12A:
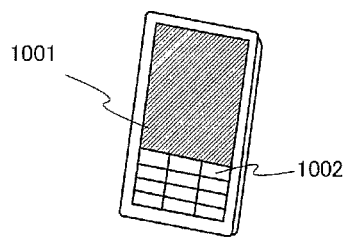
FIGS. 12A to 12F illustrate structural examples of electronic devices in Embodiment 8.

The electronic device in FIG. 12A is a personal digital assistant. The personal digital assistant in FIG. 12A has at least an input-output portion 1001. The personal digital assistant in FIG. 12A can be used as a cell phone, for example, when the input-output portion 1001 is provided with an operation portion 1002. For example, in a portion of the input-output portion 1001, which is to be the operation portion 1002, a reset signal and a selection signal are output and an optical data voltage is output, whereby light detection is performed. Meanwhile, in the other portion of the input-output portion 1001, output of a reset signal and a selection signal is stopped so that light is not detected. Thus, power consumption can be reduced. Further, the personal digital assistant in FIG. 12A may be utilized as a handy scanner or a substitute for a scratch pad.

Figure 12B:
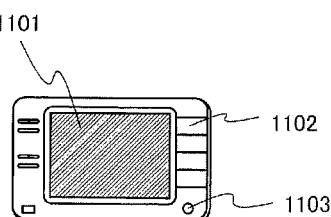

The electronic device in FIG. 12B is an information guide terminal such as an automotive navigation system. The information guide terminal in FIG. 12B has at least an input-output portion 1101, and may also have operation buttons 1102, an external input terminal 1103, and the like. When the input-output device of the above embodiment is provided for the input-output portion 1101, data can be input to the input-output portion 1101 with the use of light. For example, a shadow cast by a finger or the like on the input-output portion 1101 changes the illuminance of light incident on the shadow area of the input-output portion 1101. By detecting the change, data can be input to the input-output device.

Figure 12C:
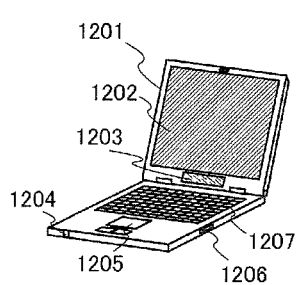

The electronic device in FIG. 12C is a laptop personal computer. The laptop personal computer in FIG. 12C has a housing 1201, an input-output portion 1202, a speaker 1203, an LED lamp 1204, a pointing device 1205, a connection terminal 1206, and a keyboard 1207. The laptop personal computer in FIG. 12C has a housing 1201, a display portion 1202, a speaker 1203, an LED lamp 1204, a pointing device 1205, a connection terminal 1206, and a keyboard 1207. The input-output device of the above embodiment is provided for the input-output portion 1202. When the input-output device of the above embodiment is provided for the input-output portion 1202, an input operation can be performed in such a manner that text is written directly on the input-output portion 1202. Further, when the input-output device of the above embodiment is provided for the input-output portion 1202, an input portion which is substitute for the keyboard 1207 can be provided in the input-output portion 1202.

Figure 12D:
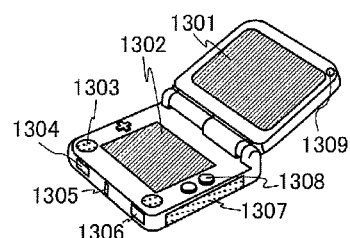

The electronic device illustrated in FIG. 12D is a portable game machine. The portable game machine in FIG. 12D has an input-output portion 1301, an input-output portion 1302, a speaker 1303, a connection terminal 1304, an LED lamp 1305, a microphone 1306, a recording medium reading portion 1307, operation buttons 1308, and a sensor 1309. The input-output device of the above embodiment is provided for both or either the input-output portion 1301 and/or the input-output portion 1302. When the input-output device of the above embodiment is provided for the input-output portion 1301, data can be input to the input-output portion 1301 with the use of light.

Figure 12E:
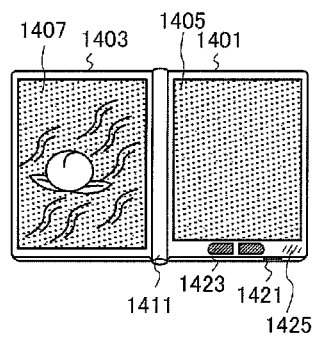

The electronic device in FIG. 12E is an e-book reader. The e-book reader in FIG. 12E has at least a housing 1401, a housing 1403, an input-output portion 1405, an input-output portion 1407, and a hinge 1411.

The housings 1401 and 1403 are connected by the hinge 1411 so that the e-book reader in FIG. 12E can be opened and closed along the hinge 1411. With such a structure, the e-book reader can be handled like a paper book. The input-output portion 1405 and the input-output portion 1407 are incorporated in the housing 1401 and the housing 1403, respectively. The input-output portion 1405 and the input-output portion 1407 may display different images. For example, one image can be displayed across both the input-output portions. In the case where different images are displayed on the input-output portion 1405 and the input-output portion 1407, for example, text may be displayed on the input-output portion on the right side (the input-output portion 1405 in FIG. 12E) and graphics may be displayed on the input-output portion on the left side (the input-output portion 1407 in FIG. 12E).

In the e-book reader in FIG. 12E, the housing 1401 or the housing 1403 may be provided with an operation portion or the like. For example, the e-book reader in FIG. 12E may have a power switch 1421, operation keys 1423, and a speaker 1425. In the case of the e-book reader in FIG. 12E, pages of an image with a plurality of pages can be turned with the operation keys 1423. Furthermore, in the e-book reader in FIG. 12E, a keyboard, a pointing device, or the like may be provided in either or both the input-output portion 1405 or/and the input-output portion 1407. In addition, an external connection terminal (an earphone terminal, a USB terminal, a terminal connectable to a variety of cables such as an AC adapter and a USB cable, or the like), a recording medium insertion portion, or the like may be provided on the back surface or the side surface of the housing 1401 and the housing 1403 in FIG. 12E. Furthermore, the e-book reader in FIG. 12E may have a function of an electronic dictionary.

Further, the input-output device of the above embodiment may be provided for both or either the input-output portion 1405 and/or the input-output portion 1407. When the input-output device of the above embodiment is provided for both or either the input-output portion 1405 and/or the input-output portion 1407, data can be input to both or either the input-output portion 1405 and/or the input-output portion 1407 with the use of light.

The e-book reader in FIG. 12E may transmit and receive data wirelessly. With such a structure, desired book data or the like can be purchased and downloaded from an electronic book server.

Figure 12F:
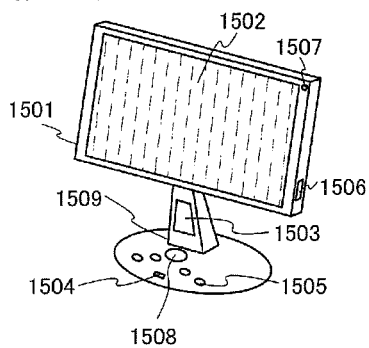

The electronic device in FIG. 12F is a display. The display in FIG. 12F has a housing 1501, an input-output portion 1502, a speaker 1503, an LED lamp 1504, operation buttons 1505, a connection terminal 1506, a sensor 1507, a microphone 1508, and a supporting base 1509. The input-output device of the above embodiment may be provided for the input-output portion 1502. When the input-output device of the above embodiment is provided for the input-output portion 1502, data can be input to the input-output portion 1502 with the use of light.

The electronic device of this embodiment may have a power supply circuit including a solar battery cell, a power storage device for charging a voltage output from the solar battery cell, and a DC converter circuit for converting a voltage charged in the power storage device into voltages needed for circuits. With such a structure, an external power source is not needed because power consumption of the input-output device of the above embodiment is low, and thus the electronic device can be used for a long period of time even at a place without an external power source.

By applying the input-output device described in the above embodiment to an input-output portion of an electronic device, a low-power-consumption electronic device can be provided.

This application is based on Japanese Patent Application serial no. 2010-056727 filed with the Japan Patent Office on Mar. 12, 2010, the entire contents of which are hereby incorporated by reference.

The invention claimed is:

1. A method for driving a circuit comprising:
a selection signal output circuit configured to output A signals;
a reset signal output circuit configured to output B signals; and
a photodetector circuit configured to be supplied with one of the A signals and with one of the B signals, wherein the photodetector circuit is allowed to output a photo data voltage in response to the one of the A signals, and wherein the photodetector circuit is brought into a reset state in response to the one of the B signals, the method comprising the steps of:
outputting an a-th signal from the selection signal output circuit;
stopping output of (a+1)-th to A-th signals from the selection signal output circuit after outputting the a-th signal;
outputting a b-th signal from the reset signal output circuit; and
stopping output of (b+1)-th to B-th signals from the reset signal output circuit after outputting the b-th signal,
wherein a is a natural number,
wherein b is a natural number,
wherein A is a natural number larger than (a+1), and
wherein B is a natural number larger than (b+1),
wherein the photodetector circuit comprises a photoelectric conversion element, a first transistor and a second transistor, wherein a gate of the second transistor is electrically connected to a terminal of the photoelectric conversion element through the first transistor, wherein a channel formation region of the first transistor comprises an oxide semiconductor layer, and
wherein an off-state current per micrometer in channel width is 10 aA or less.

2. The method for driving a circuit, according to claim 1, wherein the selection signal output circuit includes a first shift register and the reset signal output circuit includes a second shift register.

3. The method for driving a circuit, according to claim 2, wherein a first clock signal is input to the first shift register, and wherein a second clock signal is input to the second shift register, the method further comprising the steps of:
stopping output of the first clock signal to the first shift register after outputting the a-th signal; and
stopping output of the second clock signal to the second shift register after outputting the b-th signal.

4. The method for driving a circuit, according to claim 2, wherein a first clock signal and a first power supply voltage are input to the first shift register, and wherein a second clock signal and a second power supply voltage are input to the second shift register, the method further comprising the steps of:
stopping output of the first clock signal and the first power supply voltage to the first shift register after outputting the a-th signal; and
stopping output of the second clock signal and the second power supply voltage to the second shift register after outputting the b-th signal.

5. The method for driving a circuit, according to claim 2, wherein the first shift register is configured to output X signals,
wherein the second shift register is configured to output Y signals,
wherein X is a natural number larger than A, and
wherein Y is a natural number larger than B.

6. The method for driving a circuit, according to claim 1, wherein a display device includes the circuit according to claim 1.

7. A method for driving a circuit comprising:
a display circuit included in a display portion;
a selection signal output circuit configured to output A signals;
a reset signal output circuit configured to output B signals; and
a photodetector circuit included in the display portion, the photodetector circuit being configured to be supplied with one of the A signals and with one of the B signals, wherein the photodetector circuit is allowed to output a photo data voltage in response to the one of the A signals, and wherein the photodetector circuit is brought into a reset state in response to the one of the B signals, the method comprising the steps of:
outputting an a-th signal from the selection signal output circuit;
stopping output of (a+1)-th to A-th signals from the selection signal output circuit after outputting the a-th signal;
outputting a b-th signal from the reset signal output circuit; and
stopping output of (b+1)-th to B-th signals from the reset signal output circuit after outputting the b-th signal,
wherein a is a natural number,
wherein b is a natural number,
wherein A is a natural number larger than (a+1), and
wherein B is a natural number larger than (b+1),
wherein the photodetector circuit comprises a photoelectric conversion element, a first transistor and a second transistor, wherein a gate of the second transistor is electrically connected to a terminal of the photoelectric conversion element through the first transistor,
wherein a channel formation region of the first transistor comprises an oxide semiconductor layer, and
wherein an off-state current per micrometer in channel width is 10 aA or less.

8. The method for driving a circuit, according to claim 7, wherein the selection signal output circuit includes a first shift register and the reset signal output circuit includes a second shift register.

9. The method for driving a circuit, according to claim 8, wherein a first clock signal is input to the first shift register, and wherein a second clock signal is input to the second shift register, the method further comprising the steps of:
stopping output of the first clock signal to the first shift register after outputting the a-th signal; and
stopping output of the second clock signal to the second shift register after outputting the b-th signal.

10. The method for driving a circuit, according to claim 8, wherein a first clock signal and a first power supply voltage are input to the first shift register, and wherein a second clock signal and a second power supply voltage are input to the second shift register, the method further comprising the steps of:
stopping output of the first clock signal and the first power supply voltage to the first shift register after outputting the a-th signal; and
stopping output of the second clock signal and the second power supply voltage to the second shift register after outputting the b-th signal.

11. The method for driving a circuit, according to claim 8, wherein the first shift register is configured to output X signals,
wherein the second shift register is configured to output Y signals,
wherein X is a natural number larger than A, and
wherein Y is a natural number larger than B.

12. The method for driving a circuit, according to claim 7, wherein a display device includes the circuit according to claim 7.

13. A method for driving a circuit comprising:
a selection signal output circuit configured to output A signals;
a reset signal output circuit configured to output B signals; and
a plurality of photodetector circuits each configured to be supplied with any one of A signals and any one of B signals, wherein the photodetector circuit is allowed to output a photo data voltage in response to one of the A signals, and wherein the photodetector circuit is brought into a reset state in response to one of the B signals,
the method comprising a first operation mode and a second operation mode,
wherein the first operation mode comprises:
outputting first to B-th signals from the reset signal output circuit to the plurality of photodetector circuits; and
outputting first to A-th signals from the selection signal output circuit to the plurality of photodetector circuits,
wherein the second operation mode comprises:
after the selection signal output circuit outputs an a-th signal to a first part of the plurality of photodetector circuits, stopping output of (a+1)-th to A-th signals from the selection signal output circuit to the other of the plurality of photodetector circuits; and stopping output of (b+1)-th to B-th signals from the reset signal output circuit after the reset signal output circuit outputs a b-th signal to a second part of the plurality of photodetector circuits, wherein a is a natural number, wherein b is a natural number, wherein A is a natural number larger than (a+1), and wherein B is a natural number larger than (b+1), wherein the photodetector circuit comprises a photoelectric conversion element, a first transistor and a second transistor, wherein a gate of the second transistor is electrically connected to a terminal of the photoelectric conversion element through the first transistor, wherein a channel formation region of the first transistor comprises an oxide semiconductor layer, and wherein an off-state current per micrometer in channel width is 10 aA or less.

14. The method for driving a circuit, according to claim 13, wherein the selection signal output circuit includes a first shift register and the reset signal output circuit includes a second shift register.

15. The method for driving a circuit, according to claim 14, wherein a first clock signal is input to the first shift register, and wherein a second clock signal is input to the second shift register, the method further comprising the steps of:

stopping output of the first clock signal to the first shift register after the selection signal output circuit outputs the a-th signal; and stopping output of the second clock signal to the second shift register after the reset signal output circuit outputs the b-th signal.

16. The method for driving a circuit, according to claim 14, wherein a first clock signal and a first power supply voltage are input to the first shift register, and wherein a second clock signal and a second power supply voltage are input to the second shift register, the method further comprising the steps of:

stopping output of the first clock signal and the first power supply voltage to the first shift register after the selection signal output circuit outputs the a-th signal; and stopping output of the second clock signal and the second power supply voltage to the second shift register after the reset signal output circuit outputs the b-th signal.

17. The method for driving a circuit, according to claim 14, wherein the first shift register is configured to output X signals, wherein the second shift register is configured to output Y signals, wherein X is a natural number larger than A, and wherein Y is a natural number larger than B.

18. The method for driving a circuit, according to claim 13, wherein the circuit further comprises a display circuit included in a display portion, and wherein the other of the plurality of photodetector circuits are included in the display portion.

19. The method for driving a circuit, according to claim 13, wherein a display device includes the circuit according to claim 13.

* * * * *